United States Patent
Shimaji et al.

(10) Patent No.: US 10,816,337 B2
(45) Date of Patent: Oct. 27, 2020

(54) INERTIAL MEASUREMENT METHOD, INERTIAL MEASUREMENT APPARATUS, AND INERTIAL MEASUREMENT PROGRAM

(71) Applicant: FA DRONE INC., Takaoka-shi, Toyama (JP)

(72) Inventors: Takeo Shimaji, Takaoka (JP); Norio Konya, Takaoka (JP)

(73) Assignee: FA DRONE INC., Toyama (JP)

( * ) Notice: Subject to any disclaimer, the term of this patent is extended or adjusted under 35 U.S.C. 154(b) by 0 days.

(21) Appl. No.: 16/481,452

(22) PCT Filed: Jan. 27, 2018

(86) PCT No.: PCT/JP2018/002599
§ 371 (c)(1),
(2) Date: Jul. 26, 2019

(87) PCT Pub. No.: WO2018/139621
PCT Pub. Date: Aug. 2, 2018

(65) Prior Publication Data
US 2019/0360802 A1 Nov. 28, 2019

(30) Foreign Application Priority Data

Jan. 27, 2017 (JP) ................................. 2017-012961

(51) Int. Cl.
*G01B 21/22* (2006.01)
*G01C 21/16* (2006.01)
*G01P 7/00* (2006.01)

(52) U.S. Cl.
CPC ............. *G01B 21/22* (2013.01); *G01C 21/16* (2013.01); *G01P 7/00* (2013.01)

(58) Field of Classification Search
None
See application file for complete search history.

(56) References Cited

U.S. PATENT DOCUMENTS

| 6,473,713 | B1 * | 10/2002 | McCall | G01C 21/16 |
| | | | | 701/11 |
| 2004/0123661 | A1 * | 7/2004 | Painter | G01C 19/5719 |
| | | | | 73/504.13 |
| 2013/0204568 | A1 | 8/2013 | Kitaura et al. | |

FOREIGN PATENT DOCUMENTS

| JP | 2000292170 A | 10/2000 |
| JP | 2001153680 A | 6/2001 |
| JP | 2013178230 A | 9/2013 |

OTHER PUBLICATIONS

Jin et al. ("The Adaptive Kalman Filter Based on Fuzzy Logic for Inertial Motion Capture System", 2013, Measurement) (Year: 2013).*

(Continued)

*Primary Examiner* — Roy Y Yi
(74) *Attorney, Agent, or Firm* — Holtz, Holtz & Volek PC

(57) ABSTRACT

Inertial measurement method and apparatus for a mobile entity perform a filtering process for an angular velocity signal, an alignment process where an approximate initial attitude angle is calculated from acceleration and angular velocity signals and then precisely adjusted, an angular velocity/acceleration bias calculation process where angular velocity bias is calculated by subtracting Earth's angular velocity from the angular velocity signal and an acceleration bias is calculated by subtracting gravitational acceleration from the acceleration signal, an attitude angle calculation process where an angular velocity is calculated by subtracting Earth's angular velocity and the angular velocity bias from the angular velocity signal, and an attitude angle is calculated by integrating the angular velocity, a location movement amount calculation process where acceleration is calculated by subtracting the gravitational acceleration and the acceleration bias from the acceleration signal, and calculate a location movement amount by second-order integration for the acceleration.

6 Claims, 24 Drawing Sheets

(56) References Cited

OTHER PUBLICATIONS

Saadeddin et al. ("Performance Enhancement of Low-Cost, High-Accuracy, State Estimation for Vehicle Collisions Prevention System Using ANFIS", 2012, Mechanical Systems and Signal Processing.) (Year: 2012).*
International Preliminary Report on Patentability (IPRP) dated Aug. 8, 2019 (and English translation thereof) in counterpart International Application No. PCT/2018/002599.
International Search Report (ISR) dated Mar. 20, 2019 (and English translation thereof) issued in International Application No. PCT/JP2018/002599.
Written Opinion of the International Searching Authority (ISA) dated Mar. 20, 2018 issued in International Applicaiton No. PCT/JP2018/002599.

* cited by examiner

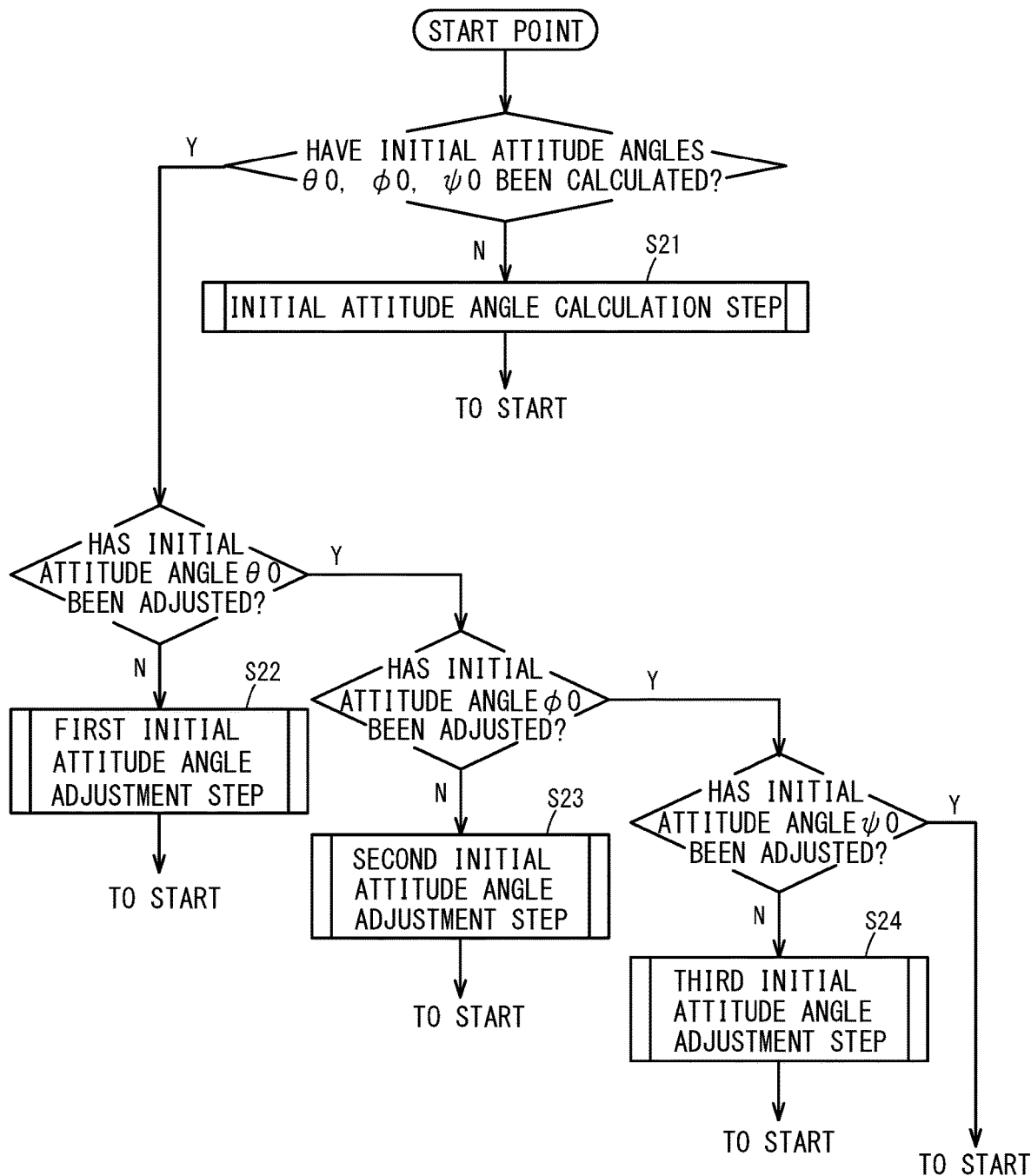

( START POINT )

S211

OBTAIN ACCELERATION SIGNAL $a^B$ AND ANGULAR VELOCITY SIGNAL $\omega^B$, AND CALCULATE AVERAGE VALUE AND VARIANCE OF EACH SIGNAL ■ ACCELERATION SIGNAL $a^B = [a(x) \ a(y) \ a(z)]^T$
- AVERAGE VALUE OF $a(x) = \bar{a}(x)$
- AVERAGE VALUE OF $a(y) = \bar{a}(y)$
- AVERAGE VALUE OF $a(z) = \bar{a}(z)$ ■ ANGULAR VELOCITY SIGNAL $\omega^B = [\omega(x) \ \omega(y) \ \omega(x)]^T$
- AVERAGE VALUE OF $\omega(x) = \bar{\omega}(x)$
- AVERAGE VALUE OF $\omega(y) = \bar{\omega}(y)$
- AVERAGE VALUE OF $\omega(z) = \bar{\omega}(z)$

< DID SPECIFIED TIME ELAPSE? >

N → TO START

Y ↓ S212

CALCULATE APPROXIMATE INITIAL ATTITUDE ANGLES $\phi 0$, $\theta 0$, AND $\psi 0$ BY ASSUMING THAT $a(x)$, $a(y)$, and $a(z)$ CALCULATED IN S211 ARE EQUAL TO TRUE GRAVITATIONAL ACCELERATION COMPONENTS $gp(x)$, $gp(y)$, AND $gp(z)$, AND $\omega(x)$, $\omega(y)$, AND $\omega(z)$ CALCULATED IN S211 ARE EQUAL TO TRUE EARTH'S ANGULAR VELOCITY COMPONENTS $\omega p(x)$, $\omega p(y)$, AND $\omega p(z)$.

■ $\phi 0 = \tan^{-1}(\bar{a}(y)/\bar{a}(z))$

■ $\theta 0 = \tan^{-1}[\bar{a}(x)/\sqrt{(\bar{a}(y)^2 + \bar{a}(z)^2})]$

■ $\psi 0 = \sin^{-1}[\bar{\omega}(x)/(\omega e \cdot \cos L \cdot \cos \theta 0)$
$\qquad + \tan L \cdot \tan \theta 0)]$ GRAVITATIONAL ACCELERATION $gp^B = [gp(x) \ gp(y) \ gp(z)]^T$
EARTH'S ANGULAR VELOCITY $\omega p^B = [\omega p(x) \ \omega p(y) \ \omega p(z)]^T$
$\omega e$: ABSOLUTE VALUE OF EARTH'S ANGULAR VELOCITY
L : LATITUDE

TO START

FIG. 11
(a)
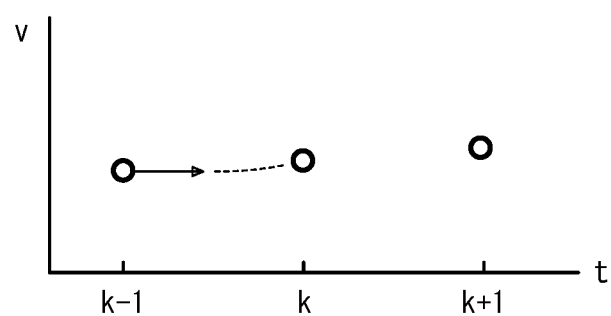
(b)
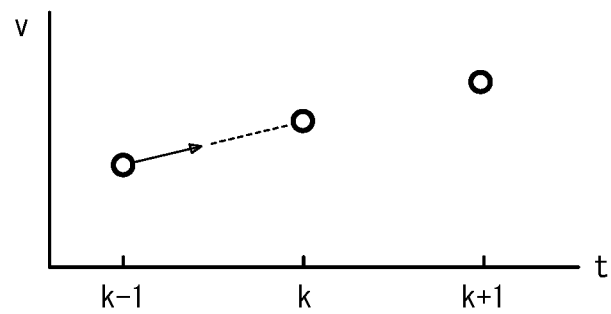

FIG. 24
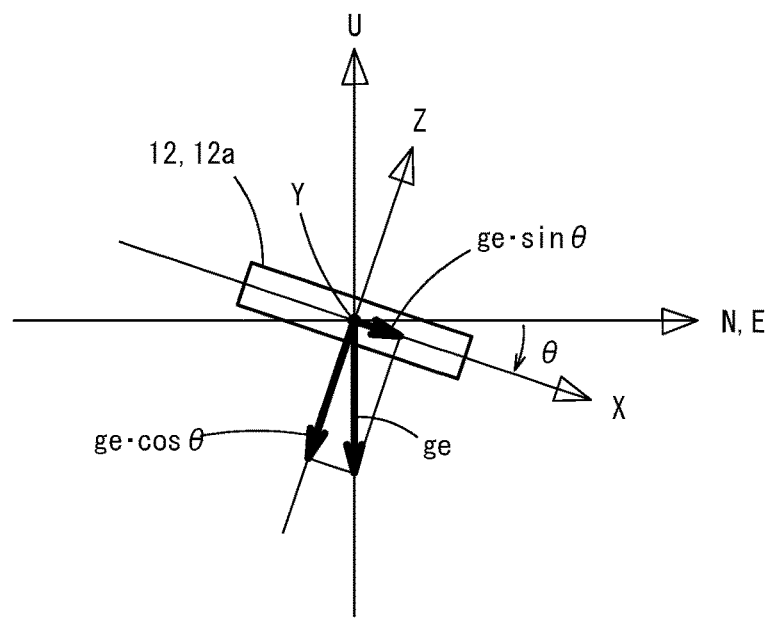
(a)
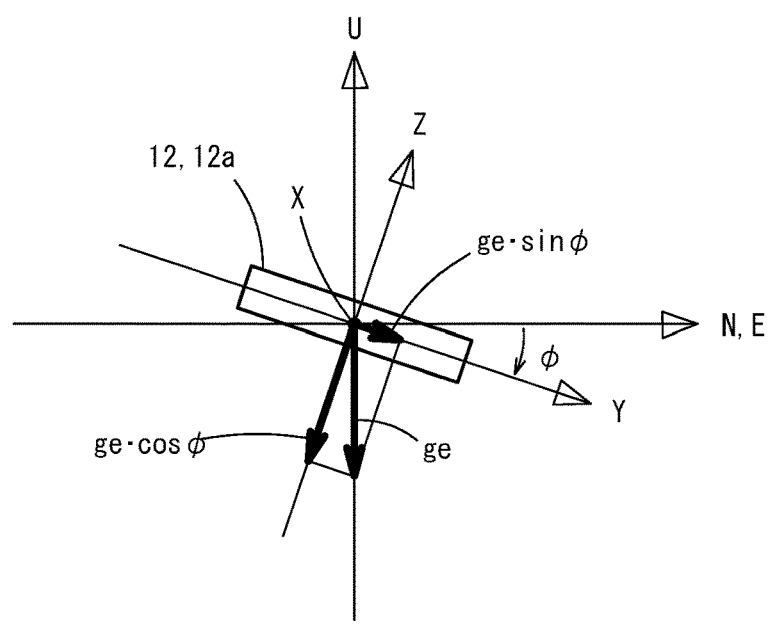
(b)

US 10,816,337 B2

INERTIAL MEASUREMENT METHOD, INERTIAL MEASUREMENT APPARATUS, AND INERTIAL MEASUREMENT PROGRAM

TECHNICAL FIELD

The present invention relates to an inertial measurement method, an inertial measurement apparatus, and an inertial measurement program for measuring an attitude/location of a mobile entity using an angular velocity sensor, an acceleration sensor, or the like.

BACKGROUND ART

In the related art, an inertial measurement method is used in various application fields, in which an angular velocity sensor or an acceleration sensor is installed in a mobile entity such as a multicopter, a robot, or an automobile, and an output signal from the sensor is integrated to detect an attitude, a location, or the like of the mobile entity. In this inertial measurement method, in a case where the output signal of each sensor is simply integrated, white noise contained in the output signal is accumulated, and an error value superimposed on the output value makes a random walk (zero point drifts randomly), so that it is difficult to perform detection with high accuracy. In the related art, various techniques have been proposed for suppressing the random walk.

In the related art, for example, as disclosed in Patent Document 1, there is known a mobile entity attitude angle detecting device including a precise angular velocity sensor that detects an angular velocity of the mobile entity, a coarse attitude angle detecting unit that detects an attitude angle of the mobile entity, and an attitude angle estimator that estimates an attitude angle of the mobile entity on the basis of the output signals of the coarse attitude angle detection unit and the precise angular velocity sensor. The attitude angle estimator estimates the attitude angle of the mobile entity and the drift value of the precise angular velocity sensor by applying a dynamic Kalman filter to the coarse attitude angle signal and the precise acceleration signal, and outputs an attitude angle estimation value by canceling the drift. The coarse attitude angle detection unit has, for example, a differential global positioning system (DGPS) having a single GPS unit or a plurality of GPS units.

CITATION LIST

Patent Document

Patent Document 1: JP-A-2000-292170

SUMMARY OF THE INVENTION

Technical Problem

In the mobile entity attitude angle detecting device of Patent Document 1, it is necessary to separately prepare the coarse attitude angle detection unit as a second detection unit in addition to the precise angular velocity sensor as a main detection unit, so that the device configuration becomes complicated. In addition, in a case where the coarse attitude angle detection unit is configured using the DGPS, it is difficult to perform detection with high accuracy under a non-GPS environment where a radio wave from a positioning satellite does not reach. Therefore, it is difficult to apply the technique of the related art to a mobile entity used in a factory or warehouse, under a bridge, in a tunnel, or the like. Furthermore, in the mobile entity attitude angle detecting device using the DGPS, it is difficult to sufficiently remove effects of white noise, and there is a limitation in the detection accuracy of the attitude angle.

The error in the inertial measurement includes an error caused by noise superimposed on a signal, an error in the integral value caused by an initial bias in the course of the integration, or the like in addition to the aforementioned random walk. In addition, the gravitational acceleration and the Earth's angular velocity (the angular velocity generated by rotation and revolution of the Earth) detected by the acceleration sensor and the angular velocity sensor are also errors. For example, in a case where inertial measurement of a multicopter or the like is performed, and a mobile entity 12 is tilted or vibrated in the air as illustrated in FIGS. 23 and 24, a gravitational acceleration component detected by the acceleration sensor changes. Therefore, it is not easy to cancel (correct) the gravitational acceleration component from the output signal. This similarly applies to the Earth's angular velocity component.

In view of the aforementioned background, an object of the invention is to provide an inertial measurement method, an inertial measurement apparatus, and an inertial measurement program for a mobile entity, capable of effectively canceling various error factors and obtaining a detection result with high accuracy even under a non-GPS environment.

Solution to Problem

According to the invention, there is provided an inertial measurement method for obtaining an attitude angle and a location movement amount of a mobile entity on the basis of an angular velocity signal output from an angular velocity sensor installed in a body of the mobile entity and an acceleration signal output from an acceleration sensor, the method including:

a filtering process for reducing a noise component superimposed on the angular velocity signal; an alignment process for calculating an approximate initial attitude angle from the acceleration signal and the angular velocity signal and then precisely adjusting the initial attitude angle such that an absolute value of a velocity obtained by integrating an acceleration obtained by subtracting a gravitational acceleration from the acceleration signal becomes equal to or smaller than a predetermined value, and an absolute value of an angle obtained by integrating an angular velocity obtained by subtracting an Earth's angular velocity from the angular velocity signal becomes equal to or smaller than a predetermined value; an angular velocity/acceleration bias calculation process for calculating an angular velocity bias by subtracting the Earth's angular velocity from the angular velocity signal and calculating an acceleration bias by subtracting the gravitational acceleration from the acceleration signal; an attitude angle calculation process for calculating an angular velocity by subtracting the Earth's angular velocity and the angular velocity bias from the angular velocity signal and calculating an attitude angle by integrating the calculated angular velocity; and a location movement amount calculation process for calculating an acceleration by subtracting the gravitational acceleration and the acceleration bias from the acceleration signal and calculating a location movement amount by performing second-order integration for the calculated acceleration, in which the filtering process, the alignment process, and the angular velocity/acceleration bias calculation process are sequentially executed in a stationary state of the mobile entity, the filtering process, the attitude angle calculation process, and the location movement amount calculation process are then executed sequentially and repeatedly, the filtering process and the alignment process in a stationary state of the mobile entity, the attitude angle calculation process in a stationary state of the mobile entity, and the location movement amount calculation process in a stationary state of the mobile entity are performed through estimation using a stationary state estimation filter capable of reducing noise superimposed on a signal, suppressing a random walk of an integral value caused by noise, and suppressing an increase of an error of an integral value caused by a bias, and the filtering process in a dynamic state of the mobile entity, the attitude angle calculation process in a dynamic state of the mobile entity, and the location movement amount calculation process in a dynamic state of the mobile entity are performed through estimation using a dynamic state estimation filter capable of reducing noise superimposed on a signal and suppressing an error of an integral value caused by noise.

In the inertial measurement method described above, an azimuth signal output from an electronic compass installed in a body of the mobile entity may be obtained, an approximate initial attitude angle may be calculated from the acceleration signal, the angular velocity signal, and the azimuth signal in the alignment process, the angular velocity bias may be calculated by assuming that the Earth's angular velocity is set to zero in the angular velocity/acceleration bias calculation process, and the angular velocity may be calculated by assuming that the Earth's angular velocity is set to zero and the attitude angle may be calculated by integrating the angular velocity in the attitude angle calculation process.

According to the invention, there is provided an inertial measurement apparatus for obtaining an attitude angle and a location movement amount of a mobile entity on the basis of an angular velocity signal output from an angular velocity sensor installed in a body of the mobile entity and an acceleration signal output from an acceleration sensor, the apparatus including:

a filtering unit configured to perform a process for reducing a noise component superimposed on the angular velocity signal; an alignment unit configured to perform a process for calculating an approximate initial attitude angle from the acceleration signal and the angular velocity signal and then precisely adjusting the initial attitude angle such that an absolute value of a velocity obtained by integrating an acceleration obtained by subtracting a gravitational acceleration from the acceleration signal becomes equal to or smaller than a predetermined value, and an absolute value of an angle obtained by integrating an angular velocity obtained by subtracting an Earth's angular velocity from the angular velocity signal becomes equal to or smaller than a predetermined value; an angular velocity/acceleration bias calculation unit configured to perform a process for calculating an angular velocity bias by subtracting the Earth's angular velocity from the angular velocity signal and calculating an acceleration bias by subtracting the gravitational acceleration from the acceleration signal; an attitude angle calculation unit configured to perform a process for calculating an angular velocity by subtracting the Earth's angular velocity and the angular velocity bias from the angular velocity signal and calculating an attitude angle by integrating the calculated angular velocity; and a location movement amount calculation unit configured to perform a process for calculating an acceleration by subtracting the gravitational acceleration and the acceleration bias from the acceleration signal and calculating a location movement amount by performing second-order integration for the calculated acceleration, in which the filtering unit, the alignment unit, and the angular velocity/acceleration bias calculation unit sequentially execute each of the processes in a stationary state of the mobile entity, the filtering unit, the attitude angle calculation unit, and the location movement amount calculation unit then execute each of the processes sequentially and repeatedly, the process of the filtering unit and the process of the alignment unit in a stationary state of the mobile entity, the process of the attitude angle calculation unit in a stationary state of the mobile entity, and the process of the location movement amount calculation unit in a stationary state of the mobile entity are performed through estimation using a stationary state estimation filter capable of reducing noise superimposed on a signal, suppressing a random walk of an integral value caused by noise, and suppressing an increase of an error of an integral value caused by a bias, and the process of the filtering unit in a dynamic state of the mobile entity, the process of the attitude angle calculation unit in a dynamic state of the mobile entity, and the process of the location movement amount calculation unit in a dynamic state of the mobile entity are performed through estimation using a dynamic state estimation filter capable of reducing noise superimposed on a signal and suppressing an error of an integral value caused by noise.

In the inertial measurement apparatus described above, the alignment unit may obtain an azimuth signal output from an electronic compass installed in a body of the mobile entity, and perform a process of calculating an approximate initial attitude angle from the acceleration signal, the angular velocity signal, and the azimuth signal, the angular velocity/acceleration bias calculation unit may perform a process of calculating the angular velocity bias by assuming that the Earth's angular velocity is set to zero, and the attitude angle calculation unit may perform a process of calculating the angular velocity by assuming that the Earth's angular velocity is set to zero and calculating the attitude angle by integrating the angular velocity.

According to the invention, there is provided an inertial measurement program including a program for executing each of the processes for executing the inertial measurement method described above.

Advantageous Effects of the Invention

In the inertial measurement method and the inertial measurement apparatus according to the invention, the unique alignment process and the angular velocity/acceleration bias calculation process are performed in a stationary state, and a process of canceling the gravitational acceleration component and the Earth's angular velocity component is performed when the attitude angle and the location movement amount are calculated. Therefore, it is possible to reduce an error caused by the gravitational acceleration and the Earth's angular velocity.

According to the invention, when the estimation is performed in each process, the stationary state estimation filter and the dynamic state estimation filter are used in different situations. The error of the inertial measurement includes, for example, (a) an error caused by noise superimposed on a signal, (b) a random walk of an integral value caused by noise, (c) an increase of an error of an integral value caused by the bias, and (d) an error of an integral value caused by noise. Therefore, it is difficult to suppress all of the errors using a single type of the estimation filter. However, according to the invention, the estimation is performed using the stationary state estimation filter capable of suppressing the errors (a), (b), and (c) in a stationary state, and the estimation is performed by using the dynamic state estimation filter capable of suppressing the errors (a) and (d) in a dynamic state. Therefore, it is possible to effectively suppress an error in the inertial measurement and measure the attitude angle and the location movement amount with high accuracy.

According to the invention, it is possible to select a relatively inexpensive angular velocity sensor by using an azimuth signal of an electronic compass for detecting an initial azimuth angle and neglecting the Earth's angular velocity. Therefore, it is possible to lower the cost of the entire apparatus.

Further, the inertial measurement apparatus according to the invention can be easily configured by deploying the inertial measurement program according to the invention in a general purpose computer. In addition, unlike the mobile entity attitude angle detecting device of Patent Document 1, it is not necessary to provide the second detection unit to suppress a random walk. Therefore, it is possible to very simply configure the apparatus.

BRIEF DESCRIPTION OF THE DRAWINGS

FIG. 3 is a flowchart illustrating details of an alignment process of FIG. 2.

FIG. 4 is a flowchart illustrating details of an initial attitude angle calculation step performed in the alignment process.

FIG. 11, (a) and (b) are timing charts for describing differences in setting methods between a stationary state estimation filter and a dynamic state estimation filter.

FIG. 24, (a) and (b) are diagrams illustrating a change of a gravitational acceleration component when the mobile entity is sloped.

MODE FOR CARRYING OUT THE INVENTION

Figure 1:
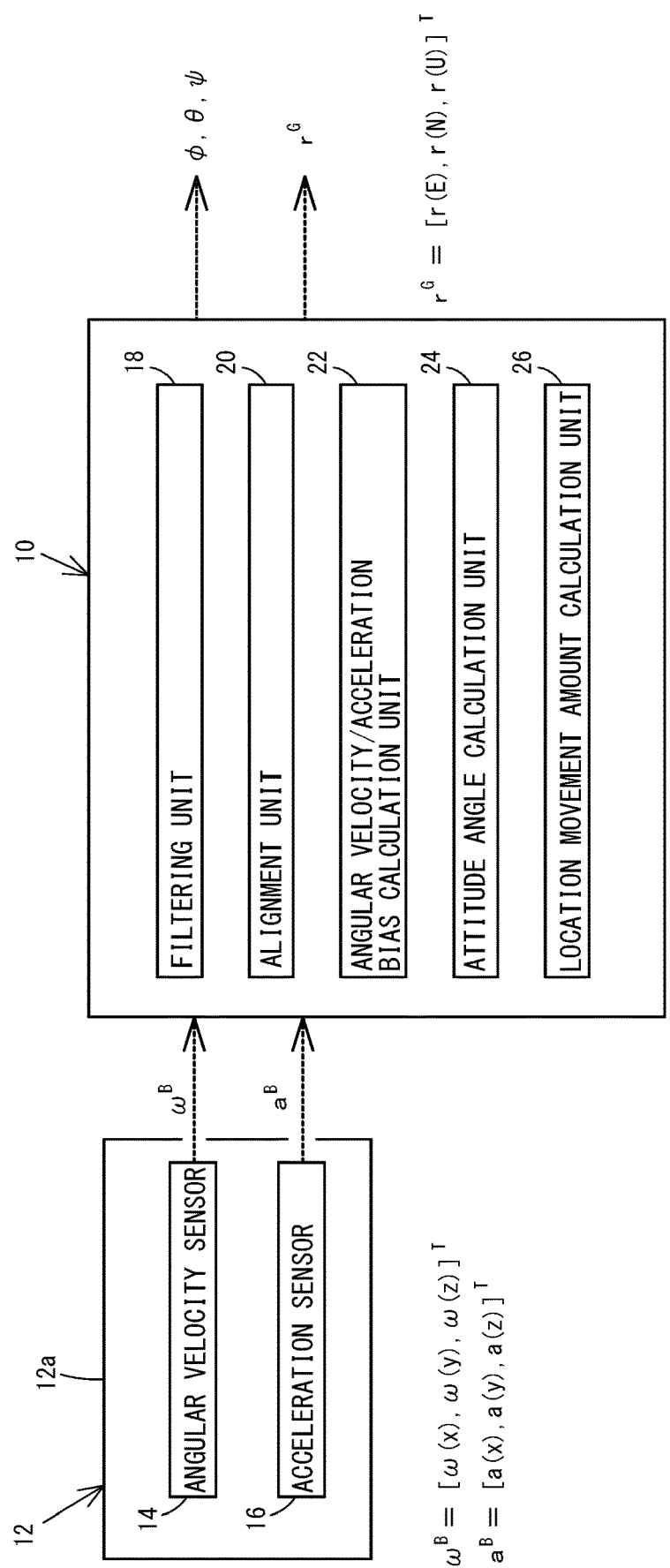
FIG. 1 is a system configuration diagram of an inertial measurement apparatus according to a first embodiment of the invention.

Hereinafter, an inertial measurement apparatus, an inertial measurement apparatus, and an inertial measurement program according to a first embodiment of the invention will now be described with reference to FIGS. 1 to 17. As illustrated in FIG. 1, an inertial measurement apparatus 10 according to this embodiment is an apparatus for obtaining an attitude angle (such as ϕ (roll), θ (pitch), and ψ (yaw)) of a mobile entity 12 and a location movement amount $r^G$ on the basis of an angular velocity signal $\omega^B$ output from an angular velocity sensor 14 installed in a body 12a of the mobile entity 12 and an acceleration signal $a^B$ output from an acceleration sensor 16. The inertial measurement method according to this embodiment is executed by installing the inertial measurement program including programs for executing each process of executing this inertial measurement method in the inertial measurement apparatus 10. Note that symbols "$\square^B$" and "$\square^G$" denote vectors, "B" denotes a representation of each axial component expressed in a body coordinate system, and "G" denotes a representation of each axial component expressed in a geographic coordinate system.

The inertial measurement apparatus 10 includes a filtering unit 18, an alignment unit 20, an angular velocity/acceleration bias calculation unit 22, an attitude angle calculation unit 24, and a location movement amount calculation unit 26. First, functions of each block will be described in brief.

The filtering unit 18 performs a process of reducing a noise component superimposed on the angular velocity signal $\omega^B$ (filtering process S1s or S1u).

The alignment unit 20 calculates approximate initial attitude angles $\phi0$, $\theta0$, and $\psi0$ from the acceleration signal $a^B$ and the angular velocity signal $\omega^B$ and then performs a process of precisely adjusting the initial attitude angles $\phi0$, $\theta0$, and $\psi0$ (alignment process S2) such that an absolute value of a velocity $Vh^B$ obtained by integrating the acceleration $ah^B$ obtained by subtracting the gravitational acceleration $gp^B$ from the acceleration signal $a^B$ becomes equal to or smaller than a predetermined value, and an absolute value of an angle obtained by integrating an angular velocity $\alpha h^B$ obtained by subtracting an Earth's angular velocity $\omega p^B$ from the angular velocity signal $\omega^B$ becomes equal to or smaller than a predetermined value.

The angular velocity/acceleration bias calculation unit 22 performs a process of calculating an angular velocity bias $\omega b^B$ by subtracting the Earth's angular velocity $\omega p^B$ from the angular velocity signal $\omega^B$ and calculating an acceleration bias $ab^B$ by subtracting the gravitational acceleration $gp^B$ from the acceleration signal $a^B$ (angular velocity/acceleration bias calculation process S3).

The attitude angle calculation unit 24 performs a process of calculating a correction angular velocity $\omega h^B$ by subtracting the Earth's angular velocity $\omega p^B$ and the angular velocity bias $\omega b^B$ from the angular velocity signal $\omega^B$ and calculating the attitude angles $\phi$, $\theta$, and $\psi$ by integrating the correction angular velocity $\omega h^B$ (attitude angle calculation process S4s or S4u).

The location movement amount calculation unit 26 performs a process of calculating a correction acceleration $ah^G$ by subtracting the gravitational acceleration $gp^B$ and the acceleration bias $ab^B$ from the acceleration signal $a^B$ and calculating a location movement amount $r^G$ by performing second-order integration for the correction acceleration $ah^G$ (location movement amount calculation process S5s or S5u).

Figure 2:
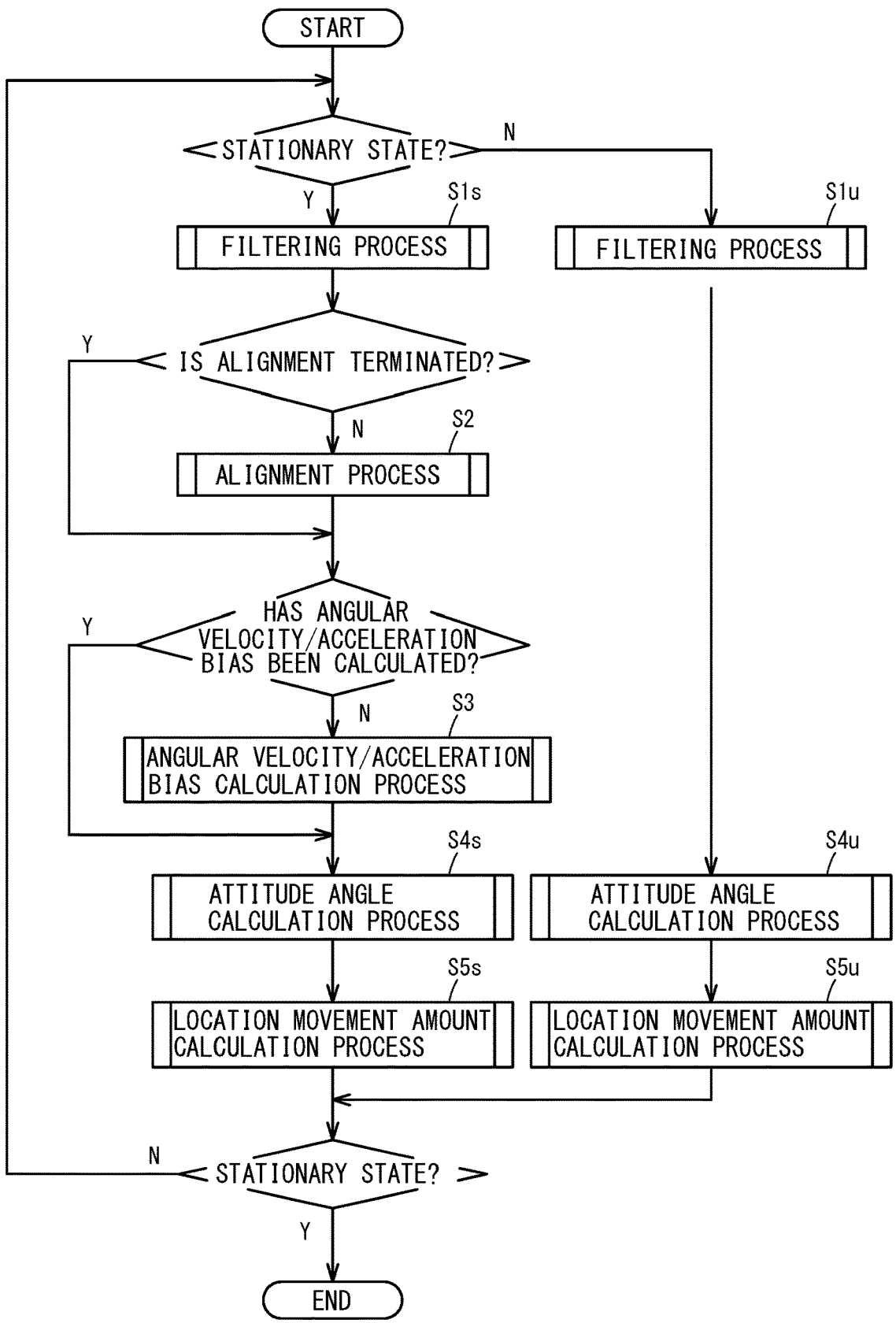
FIG. 2 is a flowchart illustrating an inertial measurement method performed by the inertial measurement apparatus according to the first embodiment (the inertial measurement method according to the first embodiment of the invention).

As illustrated in FIG. 2, when the mobile entity 12 has a stationary state, the inertial measurement apparatus 10 sequentially executes the filtering process S1s, the alignment process S2, and the angular velocity/acceleration bias calculation process S3 and then sequentially and repeatedly executes the filtering process S1s or S1u, the attitude angle calculation process S4s or S4u, and the location movement amount calculation process S5s or S5u.

In the case of a multicopter as the mobile entity 12, the "stationary state" refers to, for example, a state in which the mobile entity 12 lands on the ground and stands by or the like. If the mobile entity 12 starts a flight, the state changes to the "dynamic state". The inertial measurement apparatus 10 determines the stationary state or the dynamic state by analyzing the angular velocity signal $\omega^B$ and the acceleration signal $a^B$ using a suitable method.

Hereinafter, details of each process will now be described sequentially. As illustrated in FIG. 2, first, determination on the stationary state or the dynamic state is performed. If it is determined as the stationary state, the filtering process S1s is performed. As the filtering, a process of reducing a noise component superimposed on the angular velocity signal $\omega^B$ is performed by estimation using a stationary state estimation filter As1. The stationary state estimation filter As1 is a filter set to reduce noise superimposed on a signal and suppress an error in the integral value caused by noise in the course of the integration, as will be described below in details.

If the alignment is not terminated in the stationary state after the filtering process S1s is terminated, the alignment process S2 is performed. The alignment process S2 includes an initial attitude angle calculation step S21 and three initial attitude angle adjustment steps S22, S23, and S24. As illustrated in FIG. 3, if the alignment process S2 starts, and the initial attitude angles $\phi0$, $\theta0$, and $\psi0$ have not been calculated, the initial attitude angle calculation step S21 is performed.

As illustrated in FIG. 4, in the initial attitude angle calculation step S21, first, in step S211, the acceleration signal $a^B$ and the angular velocity signal $\omega^B$ subjected to the filtering process are obtained, and an average value and a variance of each signal for a specified time are calculated. In addition, after the specified time elapses, the operation advances to step S212, so that the initial attitude angles $\phi0$, $\theta0$, and $\psi0$ are calculated by assuming that the average value of the acceleration signal $a^B$ calculated in step S211 is equal to a true gravitational acceleration $gp^B$, and the average value of the angular velocity signal $\omega^B$ is equal to a true Earth's angular velocity $\omega p^B$ (step S212). This assumption is on the basis that the alignment process S2 is performed on the basis of the acceleration signal $a^B$ and the angular velocity signal $\omega^B$ for the stationary state. Under the aforementioned assumption, the approximate initial attitude angles $\phi0$, $\theta0$, and $\psi0$ can be simply obtained from the simple formulas described in FIG. 4.

Figure 5:
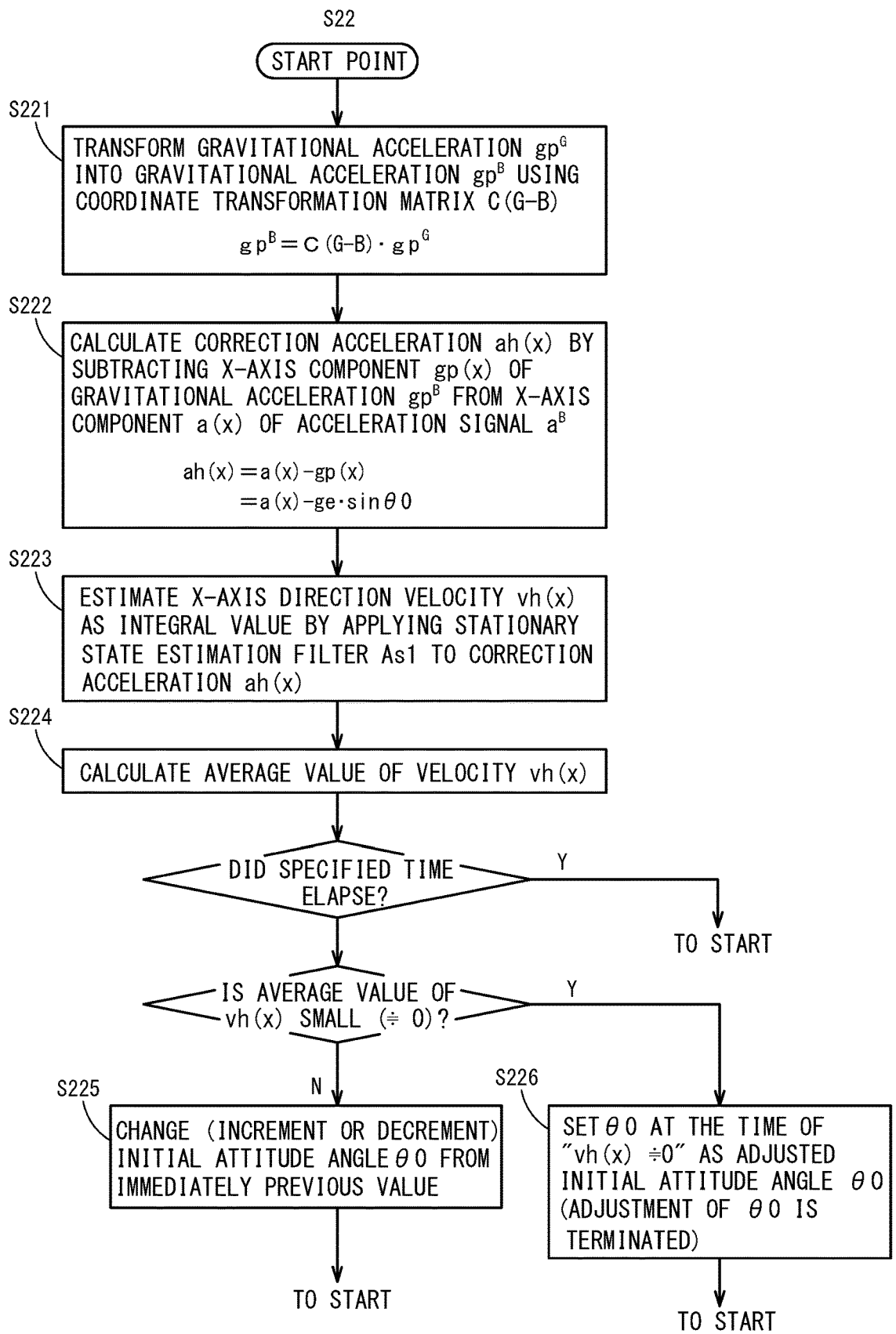
FIG. 5 is a flowchart illustrating details of a first initial attitude angle adjustment step performed in the alignment process.

If the initial attitude angle $\theta0$ has not been adjusted after the initial attitude angles $\phi0$, $\theta0$, and $\psi0$ are calculated, the operation advances to the first initial attitude angle adjustment step S22. The first initial attitude angle adjustment step S22 is a step of precisely adjusting the initial attitude angle $\theta0$. As illustrated in FIG. 5, first, the operation advances to step S221, so that the gravitational acceleration $gp^G$ of the geographic coordinate system is transformed into the gravitational acceleration $gp^B$ of the body coordinate system using a coordinate transformation matrix C(G–B) expressed in Formula (1). The coordinate transformation matrix C (G-B) is a matrix well known in the art, in which "C$\phi$", "C$\theta$", and "C$\psi$" in the right side denote "cos $\phi$", "cos $\theta$", and "cos $\psi$", respectively, and "S$\phi$", "S$\theta$", and "S$\psi$" denote "sin $\theta$", "sin $\theta$", and "sin $\psi$", respectively.

[Formula 1]

$$C(G-B) = \begin{bmatrix} C\theta C\phi & C\theta S\phi & -S\theta \\ S\phi S\theta C\phi - C\phi S\phi & S\phi S\theta S\phi + C\phi C\phi & S\phi C\theta \\ C\phi S\theta C\phi + S\phi S\phi & C\phi S\theta S\phi - S\phi C\phi & C\phi C\theta \end{bmatrix} \quad (1)$$

After step S221 is terminated, the operation advances to step S222, so that the correction acceleration ah(x) is calculated by subtracting an X-axis component gp(x) from the gravitational acceleration $gp^B$ from an X-axis component a(x) of the acceleration signal $a^B$ to cancel the effect of the gravitational acceleration. In addition, an X-axis direction velocity vh(x) as an integral value is estimated by applying the stationary state estimation filter As1 to the correction acceleration ah(x) (step S223). This stationary state estimation filter As1 is the same filter as that used in the filtering process S1s.

If the velocity vh(x) is estimated, an average value of the velocity vh(x) for a specified time is calculated (step S224). In addition, if the absolute value of the velocity vh (x) is greater than a predetermined value, the operation advances to step S225, so that the initial attitude angle $\theta0$ is changed (incremented or decremented) from the immediately previous value. If steps S221 to S224 are repeatedly executed by changing the initial attitude angle θ0, finally, the absolute value of the velocity vh(x) becomes equal to or smaller than a predetermined value (≈0). Then, the operation advances to step S226, so that the angle θ0 at that time is set as an adjusted initial attitude angle θ0. As a result, the adjustment of the angle θ0 is terminated.

Figure 6:
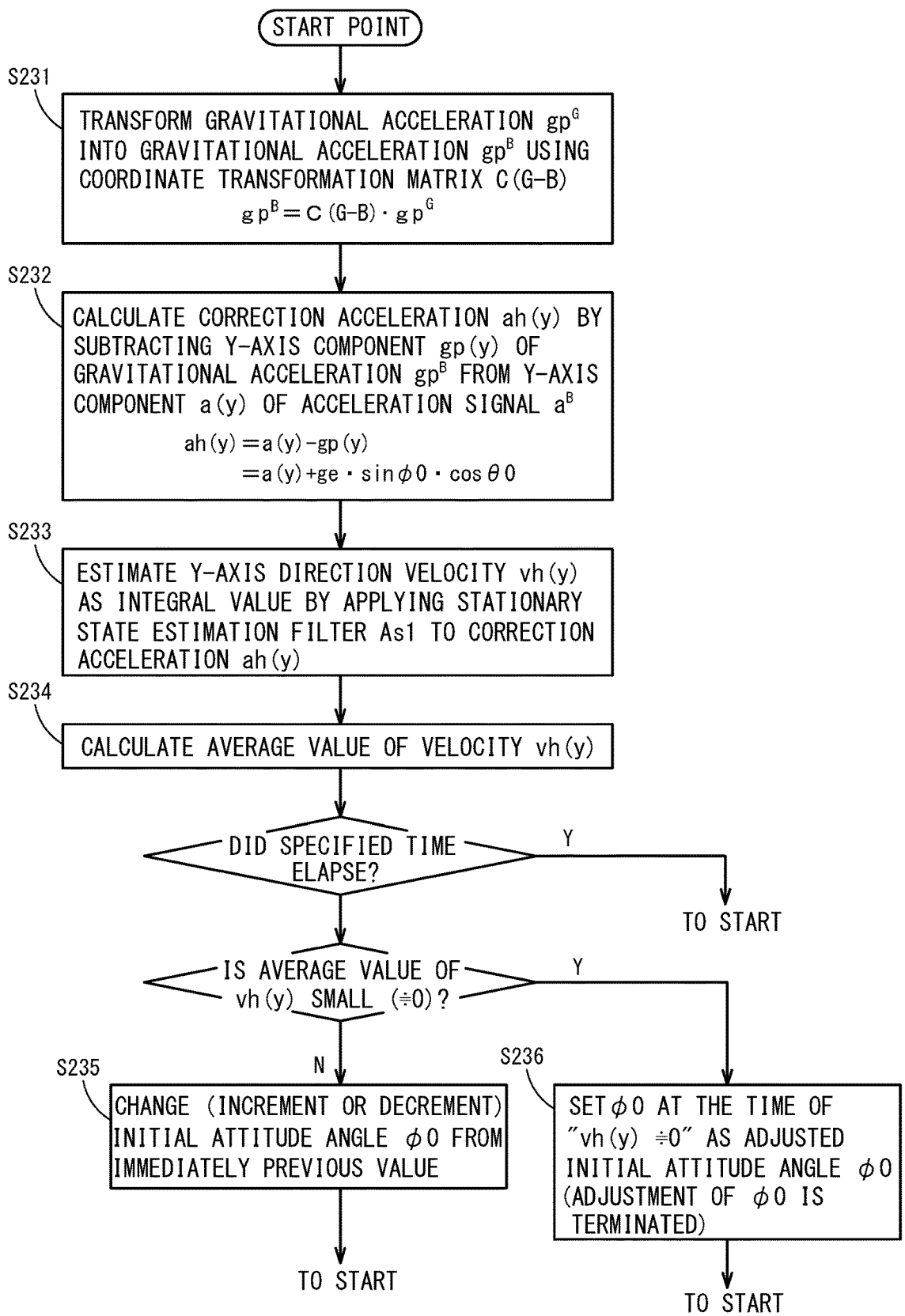
FIG. 6 is a flowchart illustrating details of a second initial attitude angle adjustment step performed in the alignment process.

In a case where the initial attitude angle φ0 has not been adjusted after adjustment of the initial attitude angle θ0 is terminated, the operation advances to the second initial attitude angle adjustment step S23 as illustrated in FIG. 3. The second initial attitude angle adjustment step S23 is a step for precisely adjusting the initial attitude angle φ0. As illustrated in FIG. 6, first, the operation advances to step S231, so that the gravitational acceleration $gp^G$ of the geographic coordinate system is transformed into the gravitational acceleration $gp^B$ of the body coordinate system using the coordinate transformation matrix C(G-B) expressed in Formula (1). Step S231 is the process similar to that of step S221 described above.

After step S231 is terminated, the operation advances to step S232, so that the correction acceleration ah(y) is calculated by subtracting a Y-axis component gp(y) of the gravitational acceleration $gp^B$ from a Y-axis component a(y) of the acceleration signal $a^B$ to cancel the effect of the gravitational acceleration. In addition, a Y-axis direction velocity vh(y) as an integral value is estimated by applying the stationary state estimation filter As1 to the correction acceleration ah(y) (step S233). The stationary state estimation filter As1 is also the same filter as that used in the filtering process S1s.

If the velocity vh(y) is estimated, an average value of the velocity vh(y) for a specified time is calculated (step S234). In addition, if an absolute value of the velocity vh (y) is equal to or greater than a predetermined value, the operation advances to step S235, so that the initial attitude angle φ0 is changed (incremented or decremented) from the immediately previous value. If steps S231 to S234 are repeatedly executed by changing the initial attitude angle φ0, finally, the absolute value of the velocity vh (y) becomes equal to or smaller than a predetermined value (≈0). Therefore, the operation advances to step S236, so that the angle φ0 at that time is set as an adjusted initial attitude angle φ0. As a result, adjustment of the angle φ0 is terminated.

Figure 7:
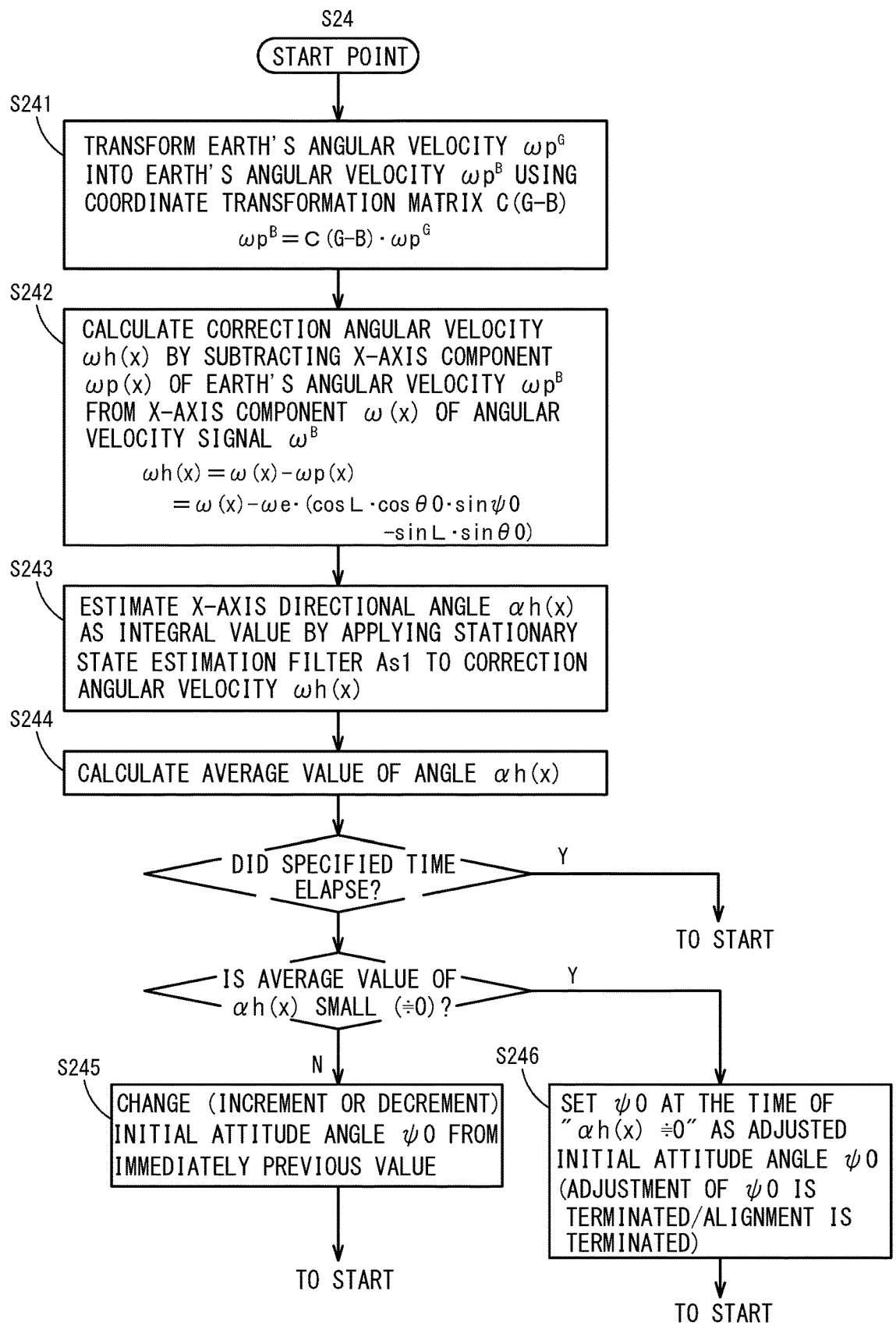
FIG. 7 is a flowchart illustrating details of a third initial attitude angle adjustment step performed in the alignment process.

If the initial attitude angle ψ0 has not been adjusted after the adjustment of the initial attitude angle φ0 is terminated, the operation advances to the third initial attitude angle adjustment step S24 as illustrated in FIG. 3. The third initial attitude angle adjustment step S24 is a step for precisely adjusting the initial attitude angle ψ0. As illustrated in FIG. 7, first, the operation advances to step S241, so that the Earth's angular velocity $\omega p^G$ of the geographic coordinate system is transformed into the Earth's angular velocity $\omega p^B$ of the body coordinate system using a coordinate transformation matrix C(G-B) expressed in Formula (1).

After step S241 is terminated, the operation advances to step S242, so that the correction angular velocity ωh(x) is calculated by subtracting an X-axis component ωp(x) of the Earth's angular velocity $\omega p^B$ from an X-axis component ω(x) of the angular velocity signal $\omega^B$ to cancel the effect of the Earth's angular velocity. In addition, an X-axis direction angle αh(x) as an integral value is estimated by applying the stationary state estimation filter As1 to the correction angular velocity ωh(x) (step S243). This stationary state estimation filter As1 is also the same filter as that used in the filtering process S1s.

If the angle αh(x) is estimated, an average value of the angle αh(x) for a specified time is calculated (step S244). In addition, if the absolute value of the angle αh (y) is equal to or greater than a predetermined value, the operation advances to step S245, so that the initial attitude angle ψ0 is changed (incremented or decremented) from the immediately previous value. If steps S241 to S244 are repeatedly executed by changing the initial attitude angle ψ0, finally, the absolute value of the angle αh (x) becomes equal to or smaller than a predetermined value (≈0). Therefore, the operation advances to step S246, so that the angle ψ0 at that time is set as an adjusted initial attitude angle ψ0. As a result, adjustment of the angle ψ0 is terminated, and the alignment process S2 is terminated.

Figure 8:
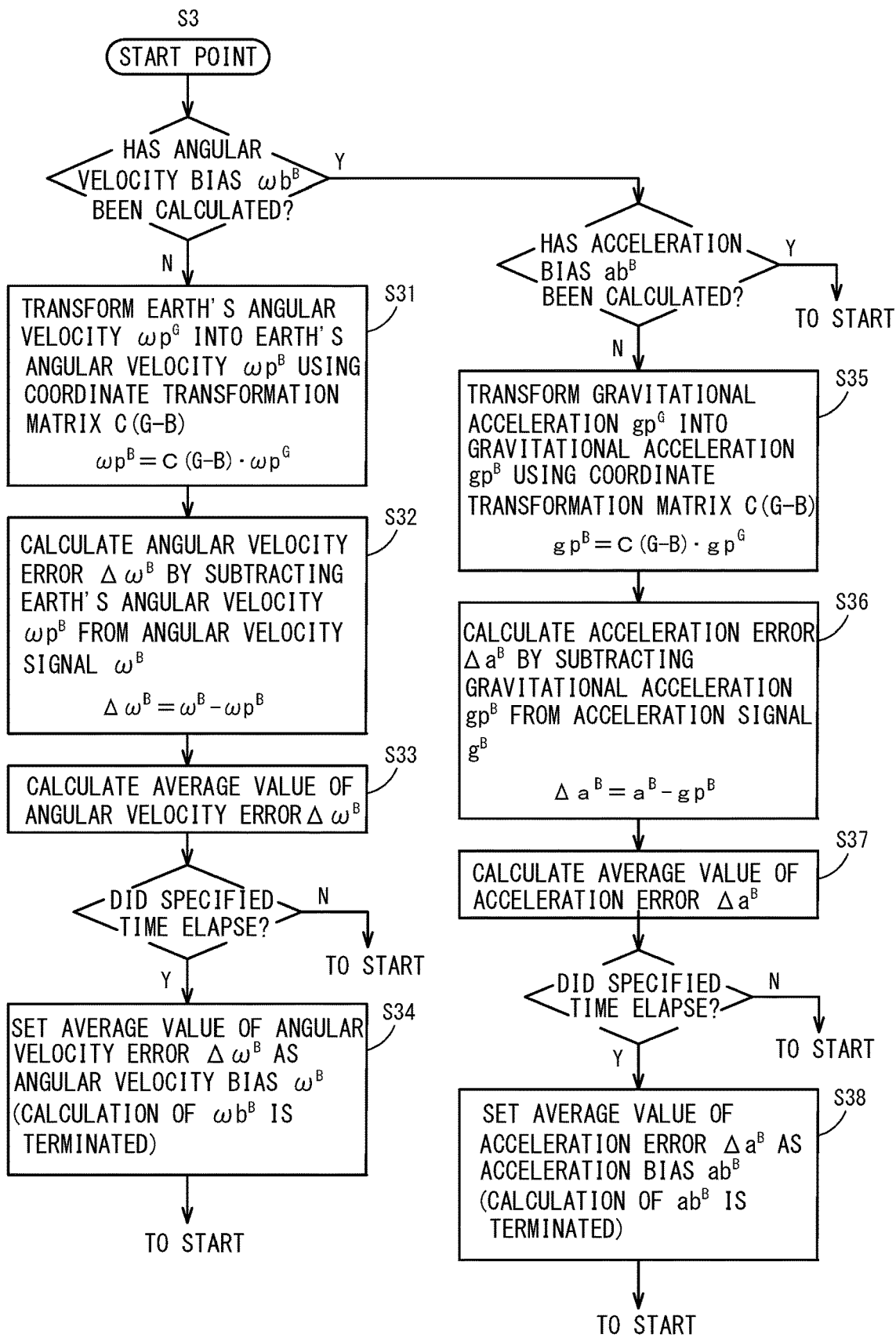
FIG. 8 is a flowchart illustrating details of an angular velocity/acceleration bias calculation process of FIG. 2.
Figure 9:
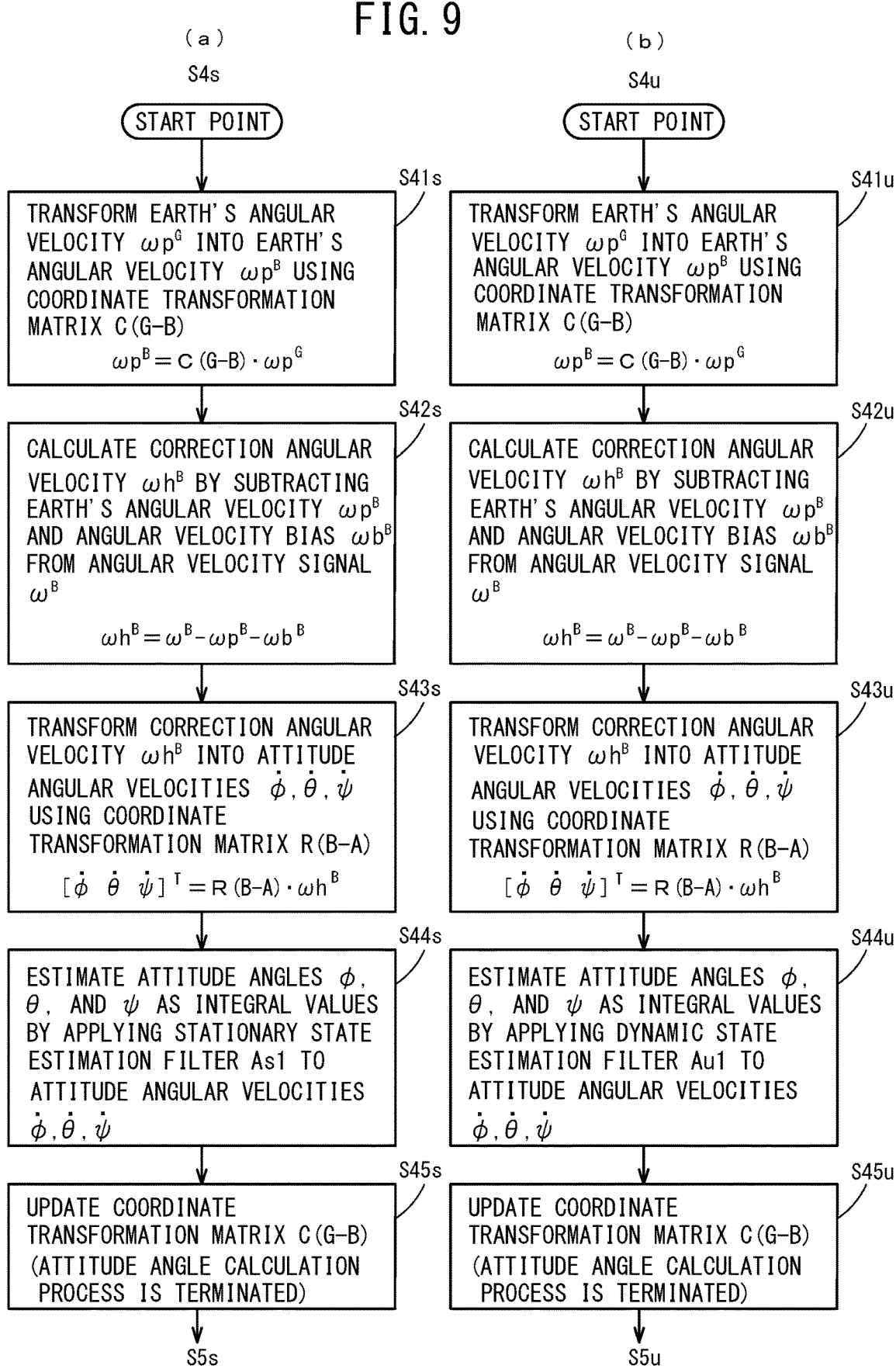
FIG. 9 is a flowchart illustrating details of the attitude angle calculation process of FIG. 2, in which (a) illustrates a process performed in a stationary state, and (b) illustrates a process performed in a dynamic state.
Figure 10:
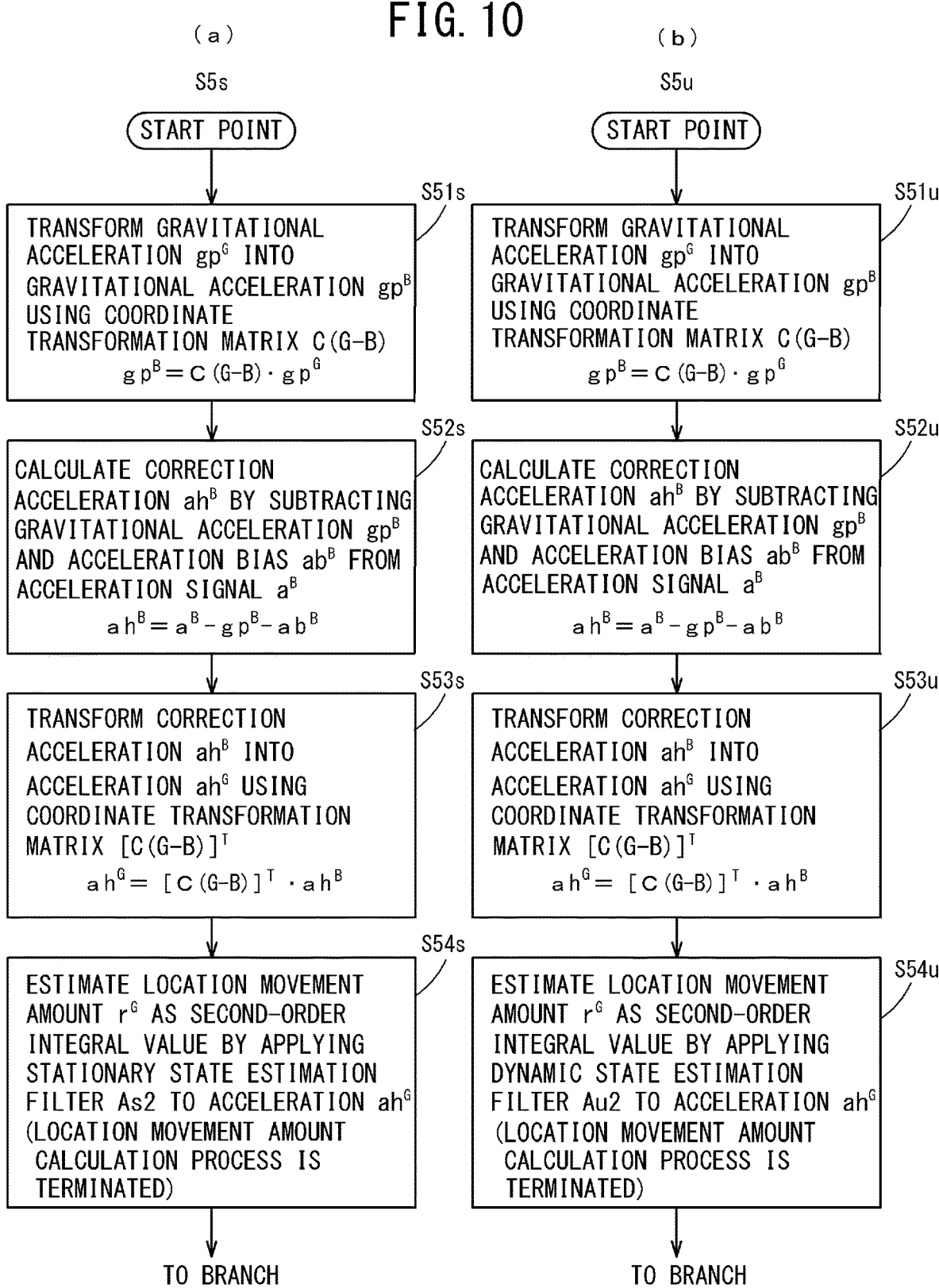
FIG. 10 is a flowchart illustrating details of a location movement amount calculation process of FIG. 2, in which (a) illustrates a process performed in a stationary state, and (b) illustrates a process performed in a dynamic state.
Figure 12:
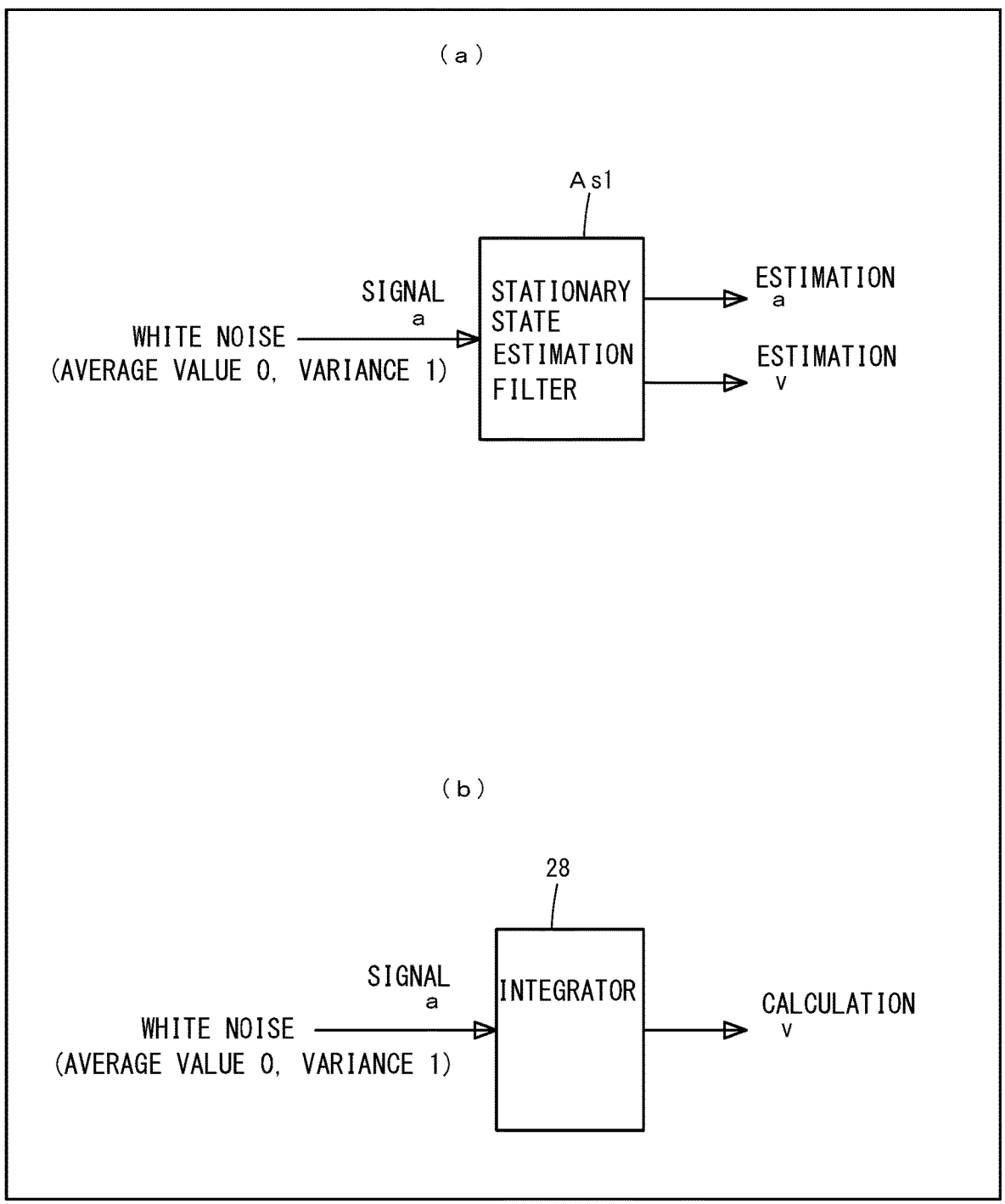
FIG. 12, (a) is a diagram illustrating a simulation condition performed to check effects of the stationary state estimation filter, and (b) is a diagram illustrating a simulation condition of a comparative example.
Figure 13:
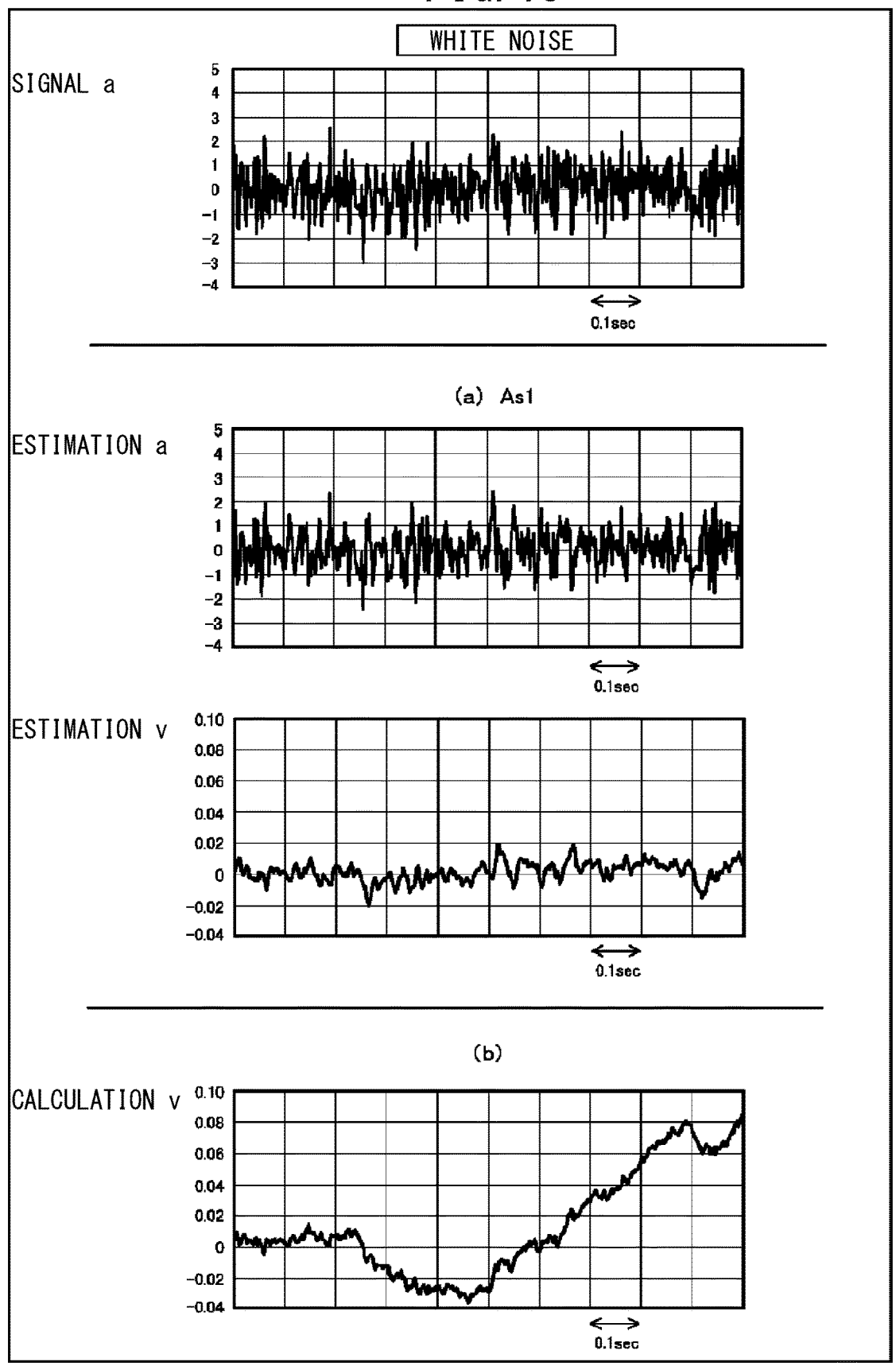
FIG. 13, (a) and (b) illustrate waveforms of simulation results under the conditions of FIG. 12, (a) and (b).
Figure 14:
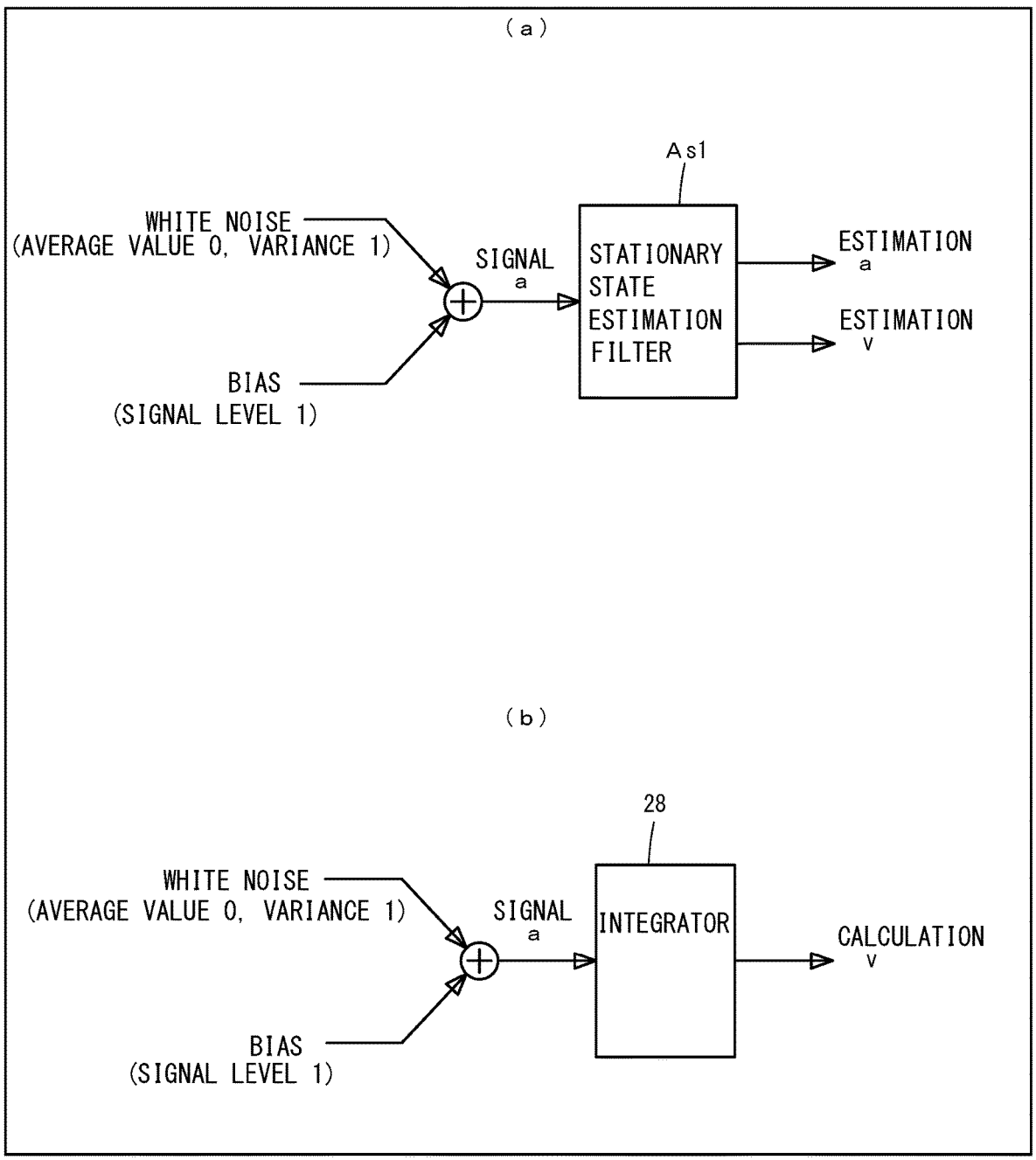
FIG. 14, (a) is a diagram illustrating a simulation condition performed to check effects of the stationary state estimation filter, and (b) is a diagram illustrating a simulation condition of a comparative example.
Figure 15:
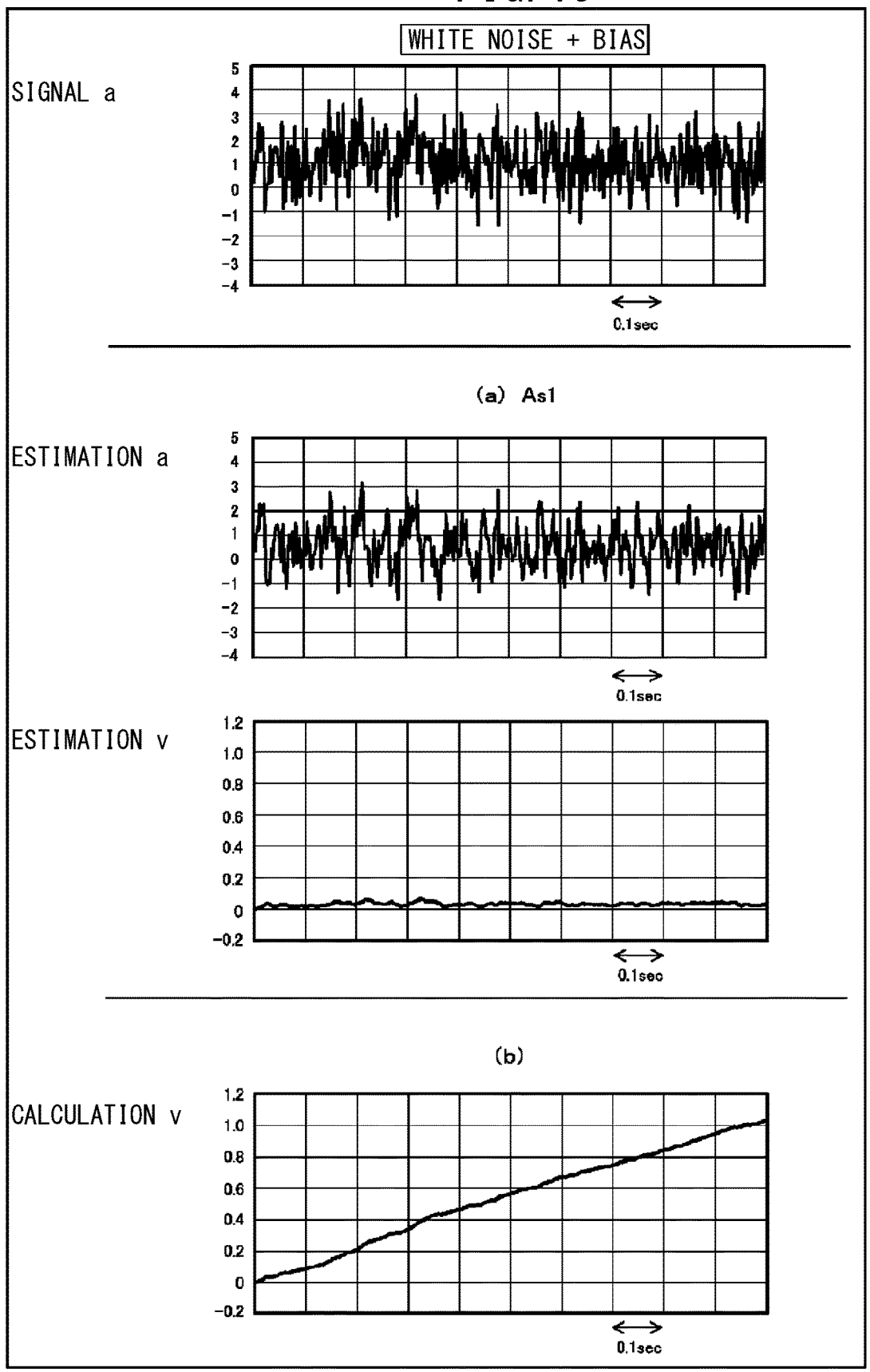
FIG. 15, (a) and (b) illustrate waveforms of the simulation results under the conditions of FIGS. 14(a) and 14(b).
Figure 16:
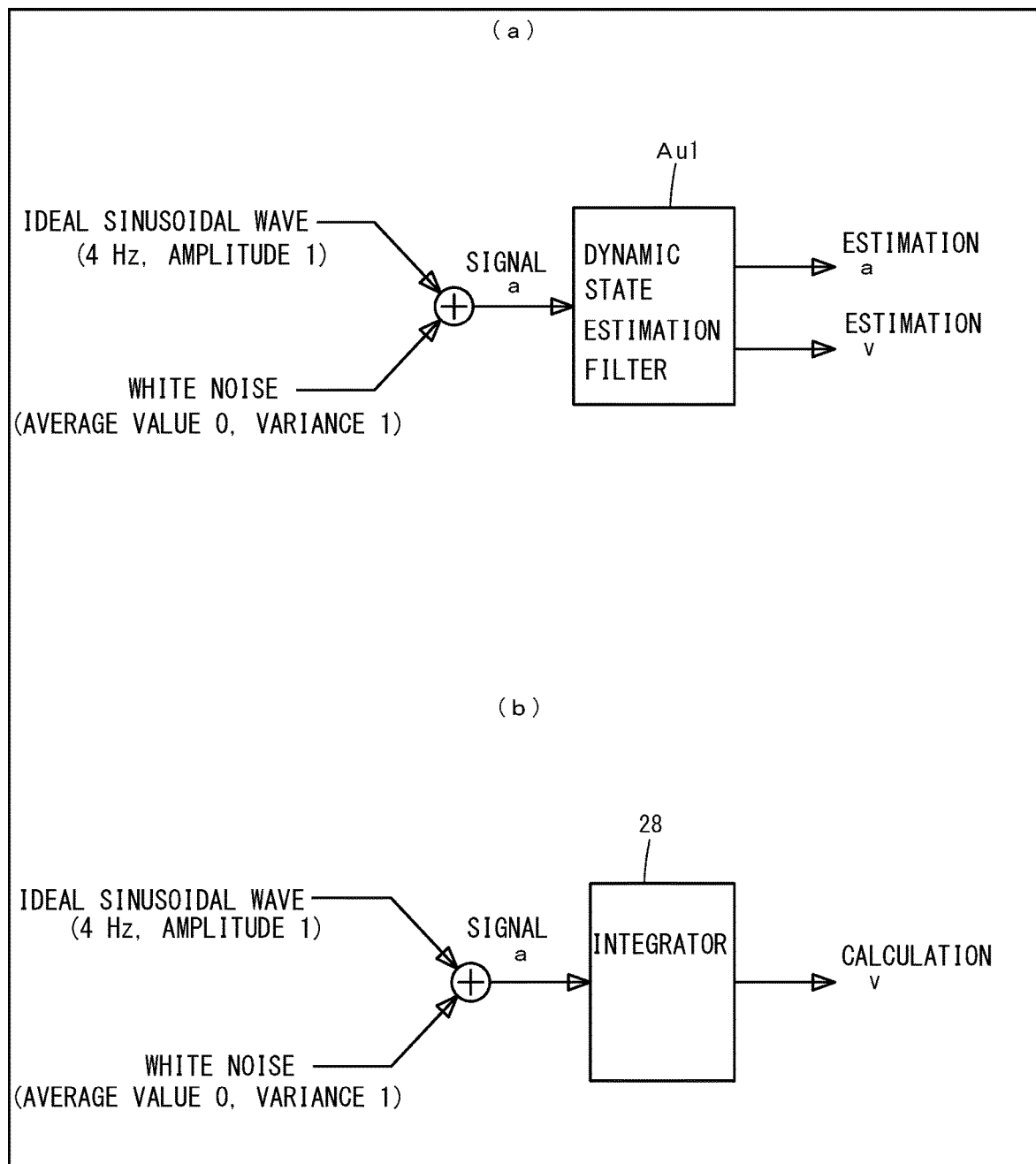
FIG. 16, (a) is a diagram illustrating a simulation condition performed to check effects of the dynamic state estimation filter, and (b) is a diagram illustrating a simulation condition of a comparative example.
Figure 17:
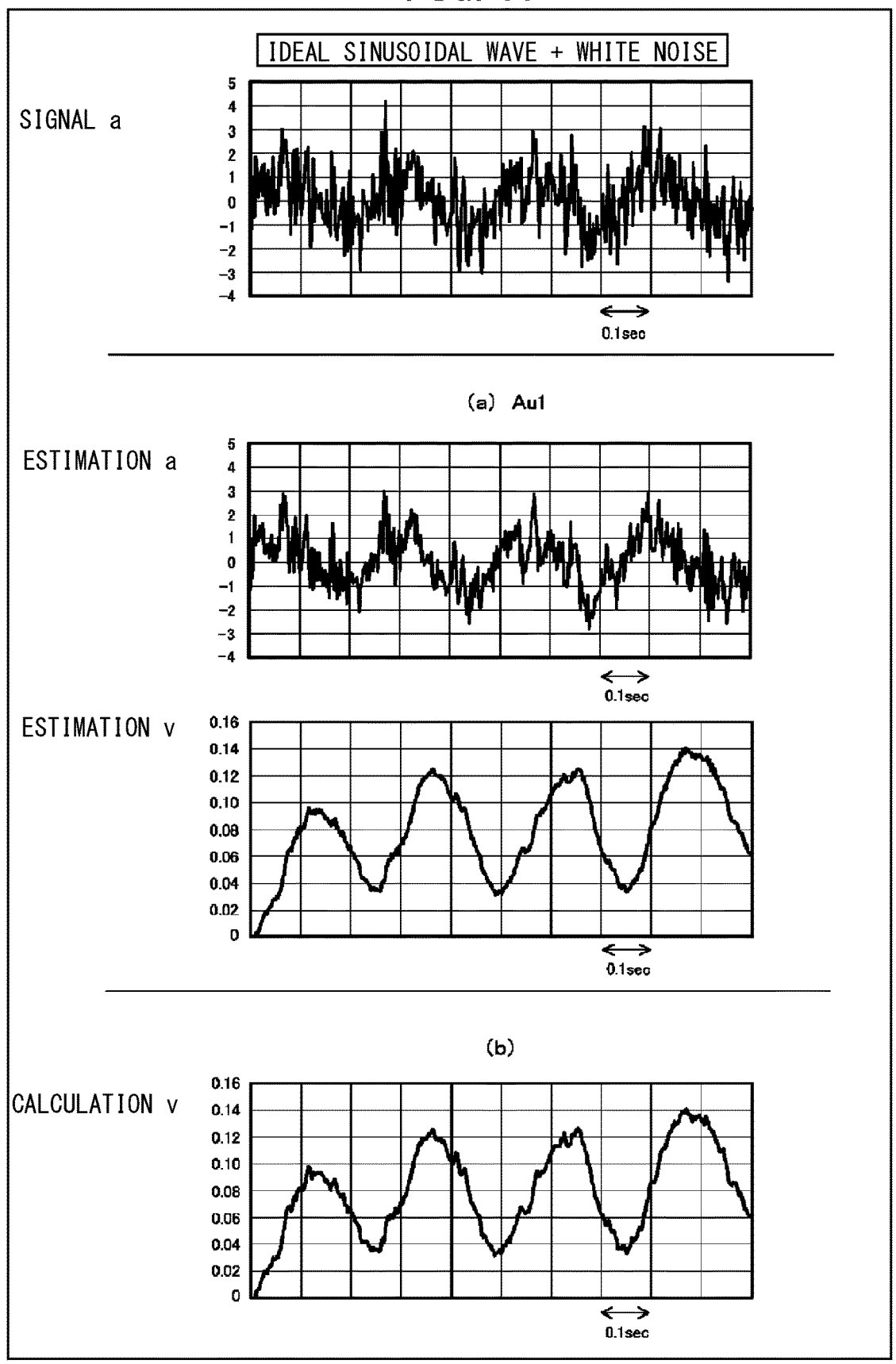
FIGS. 17, (a) and 17(b) illustrate waveforms of simulation results under the conditions of FIGS. 16, (a) and (b).

If the angular velocity $\omega b^B$ and the acceleration bias $ab^B$ in a stationary state have not been calculated after the alignment process S2 is terminated, the angular velocity/acceleration bias calculation process S3 is performed. In the angular velocity/acceleration bias calculation process S3, as illustrated in FIG. 8, if the angular velocity bias $\omega b^B$ has not been calculated, first, the operation advances to step S31, so that the Earth's angular velocity $\omega p^G$ of the geographic coordinate system is transformed into the Earth's angular velocity $\omega p^B$ of the body coordinate system using a coordinate transformation matrix C(G-B) expressed in Formula (1). In addition, the operation advances to step S32, so that an angular velocity error $\Delta\omega^B$ is calculated by subtracting the Earth's angular velocity $\omega p^B$ from the angular velocity signal $\omega^B$.

If the angular velocity error $\Delta\omega^B$ is calculated, an average value of the angular velocity error $\Delta\omega^B$ for a specified time is calculated, and a result thereof is set as the angular velocity bias $\omega b^B$ (step S34). As a result, the calculation of the angular velocity bias $\omega b^B$ is terminated.

If the acceleration bias $ab^B$ has not been calculated after the calculation of the angular velocity bias $\omega b^B$ is terminated, the operation advances to step S35, so that the gravitational acceleration $gp^G$ of the geographic coordinate system is transformed into the gravitational acceleration $gp^B$ of the body coordinate system using a coordinate transformation matrix C(G-B) expressed in Formula (1). In addition, the operation advances to step S36, so that an acceleration error $\Delta a^B$ is calculated by subtracting the gravitational acceleration $\omega p^B$ from the acceleration signal $a^B$.

If the acceleration error $\Delta a^B$ is calculated, an average value of the acceleration error $\Delta a^B$ for a specified time is calculated, and a result thereof is set as an acceleration bias $ab^B$ (step S34). As a result, the calculation of the acceleration bias $ab^B$ is terminated, and the angular velocity/acceleration bias calculation process S3 is terminated.

In the stationary state after the end of the angular velocity/acceleration bias calculation process S3, the attitude angle calculation process S4s is performed through the filtering process S1s as illustrated in FIG. 2. In the attitude angle calculation process S4s, as illustrated in FIG. 9(a), first, the operation advances to step S41s, so that the Earth's angular velocity $\omega p^G$ of the geographic coordinate system is transformed into the Earth's angular velocity $\omega p^B$ of the body coordinate system using a coordinate transformation matrix C(G-B) expressed in Formula (1). In addition, the operation advances to step S42s, so that the correction angular velocity $\omega h^B$ is calculated by subtracting the Earth's angular velocity $\omega p^B$ and the angular velocity bias $\omega b^B$ from the angular velocity signal $\omega^B$ to cancel an error factor such as the Earth's angular velocity.

If the correction angular velocity $\omega h^B$ is calculated, the operation advances to step S43s, so that the correction angular velocity $\omega h^B$ of the body coordinate system is transformed into attitude angular velocities φ(dot), θ(dot), and ψ(dot) on the basis of a coordinate transformation matrix R(B−A) of Formula (2). The coordinate transformation matrix R(B−A) is a matrix well known in the art.

[Formula 2]

$$R(B-A) = \begin{bmatrix} 1 & \sin\phi \cdot \tan\theta & \cos\phi \cdot \tan\theta \\ 0 & \cos\phi & -\sin\phi \\ 0 & \sin\phi/\cos\theta & \cos\phi/\cos\theta \end{bmatrix} \quad (2)$$

After step S43s is terminated, the operation advances to step S44s, so that the attitude angles φ, θ, and ψ as integral values are estimated by applying the stationary state estimation filter As1 to each of the attitude angular velocities φ(dot), θ(dot), and ψ(dot). This stationary state estimation filter As1 is the same filter as that used in the filtering process S1s. In addition, the attitude angle calculation process S4s is terminated by updating the coordinate transformation matrix C(G−B) (step S45s).

In the stationary state after the attitude angle calculation process S4s is terminated, as illustrated in FIG. 2, the location movement amount calculation process S5s is performed. In the location movement amount calculation process S5s, as illustrated in FIG. 10(a), first, the operation advances to step S51s, so that the gravitational acceleration $gp^G$ of the geographic coordinate system is transformed into the gravitational acceleration $gp^B$ of the body coordinate system using a coordinate transformation matrix C(G−B) expressed in Formula (1). In addition, the operation advances to step S52s, so that the correction acceleration $ah^B$ is calculated by subtracting the gravitational acceleration $gp^B$ and the acceleration bias $ab^B$ from the acceleration signal $a^B$ to cancel an error factor such as the gravitational acceleration.

If the correction acceleration $ah^B$ is calculated, the operation advances to step S53s, so that the correction acceleration $ah^B$ of the body coordinate system is transformed into the acceleration $ah^G$ of the geographic coordinate system using a coordinate transformation matrix C(G−B) expressed in Formula (1).

After step S53s is terminated, the operation advances to step S54s, so that a location movement amount $r^G$ as a second-order integral value is estimated by applying the stationary state estimation filter As2 to each axial component of the acceleration $ah^G$. Similar to the stationary state estimation filter As1 described above, the stationary state estimation filter As2 is a filter set to reduce noise superimposed on a signal and suppress an error in the integral value caused by noise in the course of the integration, as will be described below in more details. As a result, the attitude angle calculation process S5s is terminated.

In a dynamic state after the end of the angular velocity/acceleration bias calculation process S3, the attitude angle calculation process S4u is performed through the filtering process S1u as illustrated in FIG. 2. Unlike the filtering process S1s described above, in the filtering process S1u, a process of reducing a noise component superimposed on the angular velocity signal $\omega^B$ is performed through estimation using a dynamic state estimation filter Au1. The dynamic state estimation filter Au1 is a filter set to reduce noise superimposed on a signal and suppress an error in the integral value caused by noise in the course of the integration, as will be described below in more details.

In the attitude angle calculation process S4u, steps S41u to S45u are sequentially performed as illustrated in FIG. 9(b). In this process, steps S41u to S43u and S45u are similar to steps S41s to S43s and S45s of the stationary state, but step S44u (underlined) is different.

In step S44u, the attitude angles φ, θ, and ψ as integral values are estimated by applying the dynamic state estimation filter Au1 to the attitude angular velocities φ(dot), θ(dot), and ψ(dot) as the processing result of step S43u. This dynamic state estimation filter Au1 is the same filter as that used in the filtering process S1u. In addition, the attitude angle calculation process S4u is terminated by updating the coordinate transformation matrix C(G−B) (step S45u).

In a dynamic state after the end of the attitude angle calculation process S4u, the location movement amount calculation process S5u is performed as illustrated in FIG. 2. In the location movement amount calculation process S5u, steps S51u to S54u are sequentially performed as illustrated in FIG. 10(b). In this process, steps S51u to S53u are similar to steps S51s to S53s of the stationary state, but step S54u (underlined) is different.

In step S54u, a location movement amount $r^G$ as a second-order integral value is estimated by applying the dynamic state estimation filter Au2 to each axial component of the acceleration ahs as the processing result of step S53u. Similar to the dynamic state estimation filter Au1 described above, this dynamic state estimation filter Au2 is a filter set to reduce noise superimposed on a signal and suppress an error in the integral value caused by noise in the course of the integration, as will be described below in more details. As a result, the attitude angle calculation process S5u is terminated.

In this manner, while the mobile entity 12 has a stationary state, the inertial measurement apparatus 10 sequentially executes the filtering process S1s, the alignment process S2, and the angular velocity/acceleration bias calculation process S3. Then, the attitude angles φ(roll), θ(pitch), and ψ(yaw) of the mobile entity 12 and the location movement amount $r^G$ are obtained on the basis of the angular velocity signal $\omega^B$ and the acceleration signal $a^B$ by sequentially and repeatedly executing the filtering process S1s or S1u, the attitude angle calculation process S4s or S4u, and the location movement amount calculation process S5s or S5u.

Then, out of the four state estimation filters As1, As2, Au1, and Au2, the stationary state estimation filter As1 and the dynamic state estimation filter Au1 will be described.

The stationary state estimation filter As1 is a filter used to perform first-order integration in the alignment process S2 and the attitude angle calculation process S4s for a stationary state, and is also used in the filtering process S1s for a stationary state. In the stationary state estimation filter As1, the following Formulas (3) and (4) are set as an operational formula for performing estimation.

[Formula 3]

$$\begin{bmatrix} v(k+1) \\ v(k) \\ a(k+1) \\ a(k) \end{bmatrix} = \begin{bmatrix} 1 & 0 & dt & 0 \\ 0 & 1 & dt/4 & dt/4 \\ 1/dt & -1/dt & 3/2 & -3/2 \\ 2/dt & -2/dt & 0 & -1 \end{bmatrix} \begin{bmatrix} v(k) \\ v(k-1) \\ a(k) \\ a(k-1) \end{bmatrix} + \begin{bmatrix} 0 \\ 0 \\ 1 \\ 0 \end{bmatrix} V(k) \quad (3)$$

[Formula 4]

$$Y(k) = [0\ 0\ 1\ 0]\begin{bmatrix} v(k) \\ v(k-1) \\ a(k) \\ a(k-1) \end{bmatrix} + W(k) \quad (4)$$

In Formulas (3) and (4), state variables v(k),v(k−1), a(k), and a(k−1) are set, and an output Y(k) is obtained by adding an observation noise W(k) to the state variable a(k). The state variable "v" is an integral value of "a". For example, if the state variable "a" refers to an acceleration, the state variable "v" becomes a velocity. If "a" refers to an "angular velocity", the state variable "v" becomes an angle. In addition, the 4×4 matrix of Formula (3) is set to reduce noise superimposed on a signal in a stationary state and suppress an increase of a random walk of the integral value caused by noise in the course of the integration and an increase of an error of the integral value caused by the bias in the course of the integration.

The dynamic state estimation filter As1 is a filter used to perform first-order integration in the attitude angle calculation process S4u of the dynamic state and is also used in the filtering process S1u of the dynamic state. In the dynamic state estimation filter Au1, the aforementioned Formula (4) and the following Formula (5) are set as an operational formula for performing the estimation.

[Formula 5]

$$\begin{bmatrix} v(k+1) \\ v(k) \\ a(k+1) \\ a(k) \end{bmatrix} = \begin{bmatrix} 1 & 0 & dt & 0 \\ 1/2 & 1/2 & dt/4 & dt/4 \\ 1/dt & -1/dt & 3/2 & -3/2 \\ 2/dt & -2/dt & 0 & -1 \end{bmatrix} \begin{bmatrix} v(k) \\ v(k-1) \\ a(k) \\ a(k-1) \end{bmatrix} + \begin{bmatrix} 0 \\ 0 \\ 1 \\ 0 \end{bmatrix} V(k) \quad (5)$$

In Formulas (4) and (5), state variables v(k),v(k−1), a(k), and a(k−1) are set, and an output Y(k) is obtained by adding an observation noise W(k) to the state variable a(k). In addition, the 4×4 matrix of Formula (5) is set to reduce noise superimposed on a signal in a dynamic state and suppress an error of the integral value caused by noise in the course of the integration.

As recognized by comparing the contents of each row and each column between Formulas (3) and (5), the second row is different. The second row of the stationary state estimation filter As1 is set by assuming that the integral value "v" is maintained constant for a while after the timing k−1 (for example, between the timing k−1 and the midpoint of the timing k) as illustrated in FIG. 11(a). Meanwhile, the second row of the dynamic state estimation filter Au1 is set by assuming that the integral value "v" changes at a constant inclination from the timing k−1 to the timing k as illustrated in FIG. 11(b). Due to this difference of the method of setting the second row, the stationary state estimation filter As1 can perform suitable estimation in a stationary state, and the dynamic state estimation filter Au1 can perform suitable estimation in a dynamic state.

The inventors conducted a simulation test for checking the operation of the stationary state estimation filter As1. In the first test, as illustrated in FIG. 12(a), the signal "a" was set as white noise (a signal having an average value of "0" and a variance of "1" generated by a noise generation unit statistically controlled), and the signal "a" and the integral value "v" were estimated by applying the stationary state estimation filter As1. In addition, as a comparative example, the integral value "v" of the signal "a" was calculated by using a general integrator 28 as illustrated in FIG. 12(b).

A result of the first test is shown in FIGS. 13(a) and 13(b). Referring to the estimation "a" of the stationary state estimation filter As1, it is recognized that the white noise (=signal "a") is reduced. In addition, referring to the calculation "v" (comparative example) of the integrator 28, it is recognized that the zero point drifts randomly with time, and a random walk of the integral value caused by noise occurs in the course of the aforementioned integration. In comparison, referring to the estimation "v" of the stationary state estimation filter As1, the zero point makes nearly no drift, and the random walk is effectively suppressed.

A second test was performed to check the operation of the stationary state estimation filter As1. In the second test, as illustrated in FIG. 14(a), the signal "a" and the integral value "v" were estimated by assuming that the signal "a" is obtained by superimposing the aforementioned white noise on the bias (signal level 1) and applying the stationary state estimation filter As1. In addition, as a comparative example, as illustrated in FIG. 14(b), the integral value "v" of the signal "a" was calculated by using the general integrator 28.

A result of the second test is shown in FIGS. 15(a) and 15(b). Referring to the estimation "a" of the stationary state estimation filter As1, it is recognized that the white noise contained in the signal "a" is reduced. In addition, referring to the calculation "v" (comparative example) of the integrator 28, it is recognized that the zero point drifts upward with time, and an increase of the error of the integral value caused by the bias in the course of the aforementioned integration is occurred. In comparison, referring to the estimation "v" of the stationary state estimation filter As1, the zero point makes nearly no drift, and an increase of the error caused by the bias is effectively suppressed.

A third test was performed to check the operation of the dynamic state and stationary state estimation filter Au1. In the third test, as illustrated in FIG. 16(a), the signal "a" and the integral value "v" were estimated by assuming that the signal "a" is obtained by superimposing the aforementioned white noise on an ideal sinusoidal wave (having an amplitude of 1 and a frequency of 4 Hz) and applying the dynamic state estimation filter Au1. In addition, as a comparative example, as illustrated in FIG. 16(b), the integral value "v" of the signal "a" was calculated by using the general integrator 28.

A result of the third test is shown in FIGS. 17(a) and 17(b). Referring to the estimation "a" of the dynamic state estimation filter Au1, it is recognized that the white noise contained in the signal "a" is reduced. In addition, referring to the calculation "v" (comparative example) of the integrator 28, an error of the integral value caused by noise is recognized. However, referring to the estimation "v" of the dynamic state estimation filter Au1, the error caused by noise in the integration is effectively suppressed.

Next, out of the four state estimation filters As1, As2, Au1, and Au2, the stationary state estimation filter As2 and the dynamic state estimation filter Au2 will be described.

The stationary state estimation filter As2 is a filter used to perform second-order integration in the location movement amount calculation process S5s for a stationary state. In the stationary state estimation filter As2, the following Formulas (6) and (7) are set as an operational formula for performing the estimation.

[Formula 6]

$$\begin{bmatrix} r(k+1) \\ r(k) \\ v(k+1) \\ v(k) \\ a(k+1) \\ a(k) \end{bmatrix} = \begin{bmatrix} 1 & 0 & dt & 0 & 0 & 0 \\ 0 & 1 & dt/4 & dt/4 & 0 & 0 \\ 0 & 0 & 1 & 0 & dt & 0 \\ 0 & 0 & 0 & 1 & dt/4 & dt/4 \\ 0 & 0 & 1/dt & -1/dt & 3/2 & -3/2 \\ 0 & 0 & 2/dk & -2/dk & 0 & -1 \end{bmatrix} \begin{bmatrix} r(k) \\ r(k-1) \\ v(k) \\ v(k-1) \\ a(k) \\ a(k-1) \end{bmatrix} + \begin{bmatrix} 0 \\ 0 \\ 0 \\ 0 \\ 1 \\ 0 \end{bmatrix} V(k) \quad (6)$$

[Formula 7]

$$Y(k) = [0\ 0\ 0\ 0\ 1\ 0] \begin{bmatrix} r(k) \\ r(k-1) \\ v(k) \\ v(k-1) \\ a(k) \\ a(k-1) \end{bmatrix} + W(k) \quad (4)$$

In Formulas (6) and (7), state variables r(k), r(k−1), v(k), v(k−1), a(k), and a(k−1) are set, and an output Y(k) is obtained by adding an observation noise W(k) to the state variable a(k). The state variable "v" is an integral value of "a", and the state variable "r" is an integral value of "v". That is, if the state variable "a" refers to an acceleration, the state variable "v" becomes a velocity, and the state variable "r" becomes a location movement amount. In addition, the 6×6 matrix of Formula (6) is set to reduce noise superimposed on a signal in a stationary state and suppress an increase of a random walk of the integral value caused by noise and an increase of an error of the integral value caused by the bias.

The dynamic state estimation filter Au2 is a filter used to perform second-order integration in the location movement amount calculation S5u for the dynamic state. In the dynamic state estimation filter Au2, the aforementioned Formula (7) and the following Formula (8) are set as an operational formula for performing the estimation.

[Formula 8]

$$\begin{bmatrix} r(k+1) \\ r(k) \\ v(k+1) \\ v(k) \\ a(k+1) \\ a(k) \end{bmatrix} =$$

$$\begin{bmatrix} 1 & 0 & dt & 0 & 0 & 0 \\ 1/2 & 1/2 & dt/4 & dt/4 & 0 & 0 \\ 0 & 0 & 1 & 0 & dt & 0 \\ 0 & 0 & 1/2 & 1/2 & dt/4 & dt/4 \\ 0 & 0 & 1/dt & -1/dt & 3/2 & -3/2 \\ 0 & 0 & 2/dk & -2/dk & 0 & -1 \end{bmatrix} \begin{bmatrix} r(k) \\ r(k-1) \\ v(k) \\ v(k-1) \\ a(k) \\ a(k-1) \end{bmatrix} + \begin{bmatrix} 0 \\ 0 \\ 0 \\ 0 \\ 1 \\ 0 \end{bmatrix} V(k) \quad (8)$$

In Formulas (7) and (8), state variables r(k), r(k−1), v(k), v(k−1), a(k), and a(k−1) are set, and an output Y(k) is obtained by adding an observation noise W(k) to the state variable a(k). In addition, the 6×6 matrix of Formula (8) is set to reduce noise superimposed on a signal in a dynamic state and suppress an error of the integral value caused by noise in the course of the integration.

As recognized by comparing the contents of each row and each column between Formulas (6) and (8), the second and fourth rows are different. The difference of the fourth row is similar to that described above in conjunction with FIGS. 11(a) and 11(b). That is, the fourth row of the stationary state estimation filter As2 is set by assuming that the integral value "v" is maintained constant for a while after the timing k−1, and the fourth row of the dynamic state estimation filter Au2 is set by assuming that the integral value "v" changes at a constant inclination from the timing k−1 to the timing k as illustrated in FIG. 11(b).

The assumption for the second row is similar to that of the fourth row. That is, the second row of the stationary state estimation filter As2 is set by assuming that the integral value "r" is maintained constant for a while after the timing k−1, and the second row of the dynamic state estimation filter Au2 is set by assuming that the integral value "r" changes at a constant inclination from the timing k−1 to the timing k.

Due to this difference in the method of setting the second and fourth rows, the stationary state estimation filter As2 can perform suitable estimation in a stationary state, and the dynamic state estimation filter Au2 can perform suitable estimation in a dynamic state.

As described above, in the inertial measurement method and the inertial measurement apparatus 10 installed with the inertial measurement program according to this embodiment, the alignment process S2 and the angular velocity/acceleration bias calculation process S3 are performed in a stationary state, and the process of canceling the gravitational acceleration component and the Earth's angular velocity component is performed in the calculation of the attitude angle and the location movement amount. Therefore, it is possible to reduce an error caused by the gravitational acceleration and the Earth's angular velocity.

When the estimation is performed in each process, the stationary state estimation filters As1 and As2 and the dynamic state estimation filters Au1 and Au2 are used in different situations. Therefore, for the problems in the inertial measurement, that is, for (a) an error caused by noise superimposed on a signal, (b) a random walk of the integral value caused by noise, (c) an increase of the error of the integral value caused by the bias, and (d) an error of the integral value caused by noise, or the like, it is possible to effectively suppress the problems (a), (b), and (c) by performing estimation using the stationary state estimation filters As1 and As2 in a stationary state, effectively suppress the problems (a) and (d) by performing estimation using the dynamic state estimation filters Au1 and Au2 in a dynamic state, and measure the attitude angles $\phi$, $\theta$, and $\psi$ and the location movement amount $r^G$ with high accuracy.

The inertial measurement apparatus 10 can be easily configured using a general purpose computer. In addition, unlike the mobile entity attitude angle detecting device of Patent Document 1, it is not necessary to provide a second detection unit for suppressing the random walk. Therefore, it is possible to very simply configure the apparatus.

Next, an inertial measurement apparatus and an inertial measurement method according to a second embodiment of the invention will be described with reference to FIGS. 18 to 21. An inertial measurement apparatus 30 (and the inertial measurement method) according to this embodiment is formed by changing a part of the configuration of the inertial measurement apparatus 10 (and the inertial measurement method) described above. Here, like reference numerals denote like elements as in the inertial measurement apparatus 10, and they will not be described repeatedly.

Figure 18:
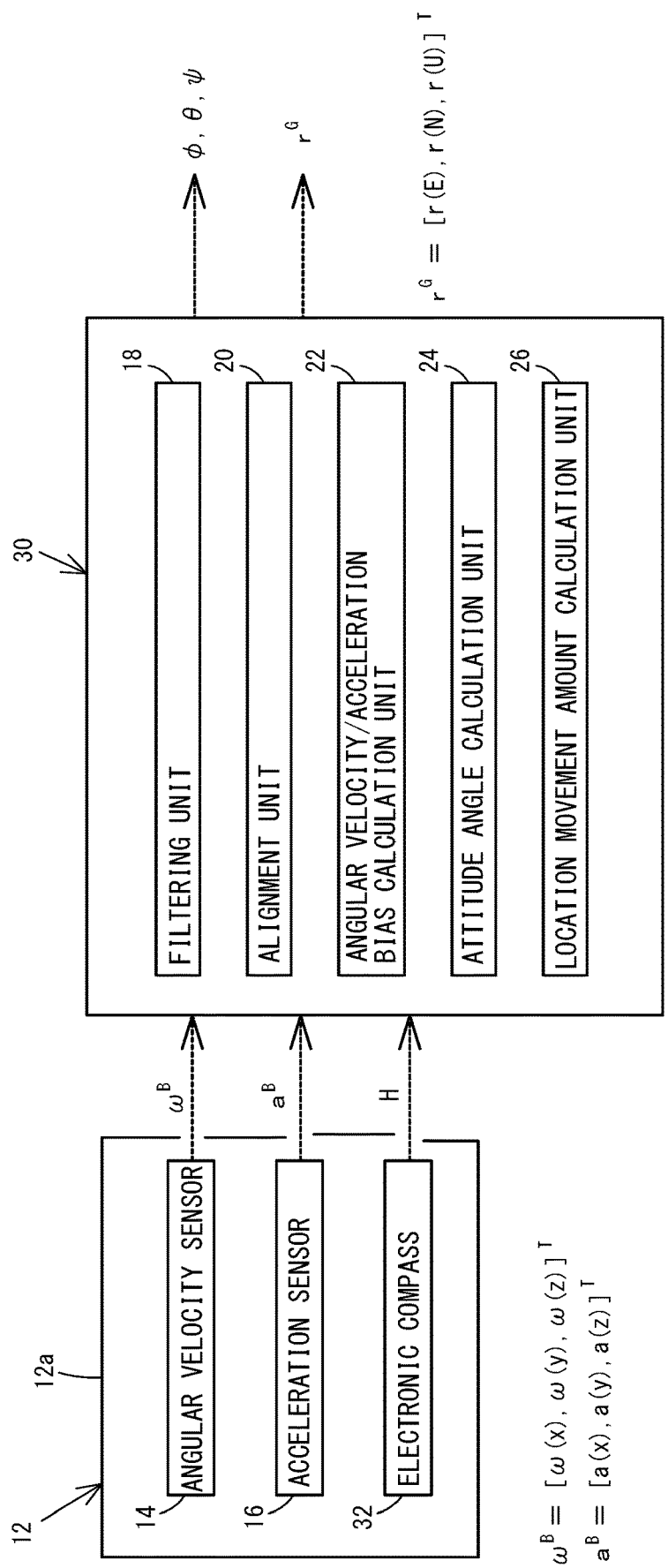
FIG. 18 is a system configuration diagram of an inertial measurement apparatus according to a second embodiment of the invention.

In the inertial measurement apparatus 10 according to the first embodiment, the number of the necessary sensor types is small (two types of sensors including the angular velocity sensor 14 and the acceleration sensor 16). However, in order to effectively perform the aforementioned alignment, it is necessary to use the high performance angular velocity sensor 14 capable of detecting the Earth's angular velocity with high accuracy. Therefore, the cost of the apparatus may increase. In comparison, in the inertial measurement apparatus 30 according to the second embodiment, since an azimuth signal H of an electronic compass 32 is used to calculate the initial attitude angle ψ0 as illustrated in FIG. 18, the inexpensive angular velocity sensor 14 can be employed. Therefore, it is possible to suppress the cost of the entire apparatus.

Although the flow of the inertial measurement method performed by the inertial measurement apparatus 30 is similar to the flow of the inertial measurement apparatus 10 as a whole (FIG. 2), some parts are slightly different in the contents of the alignment process S2, the angular velocity/acceleration bias calculation process S3, and the attitude angular velocity calculation process S4s or S4u. Therefore, the differences will now be described sequentially.

Figure 19:
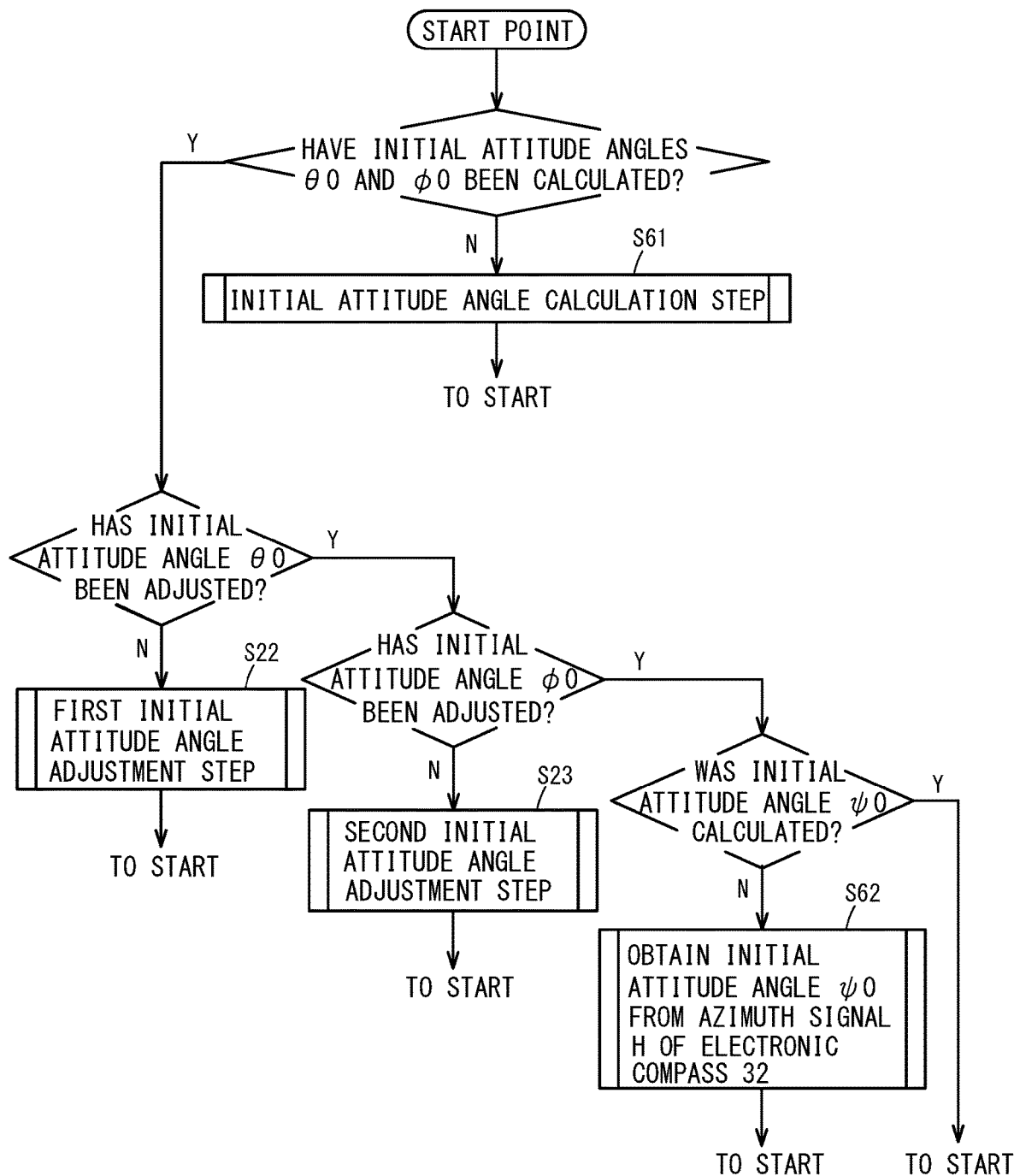
FIG. 19 is a flowchart illustrating details of the alignment process performed by the inertial measurement apparatus according to the second embodiment.
Figure 20:
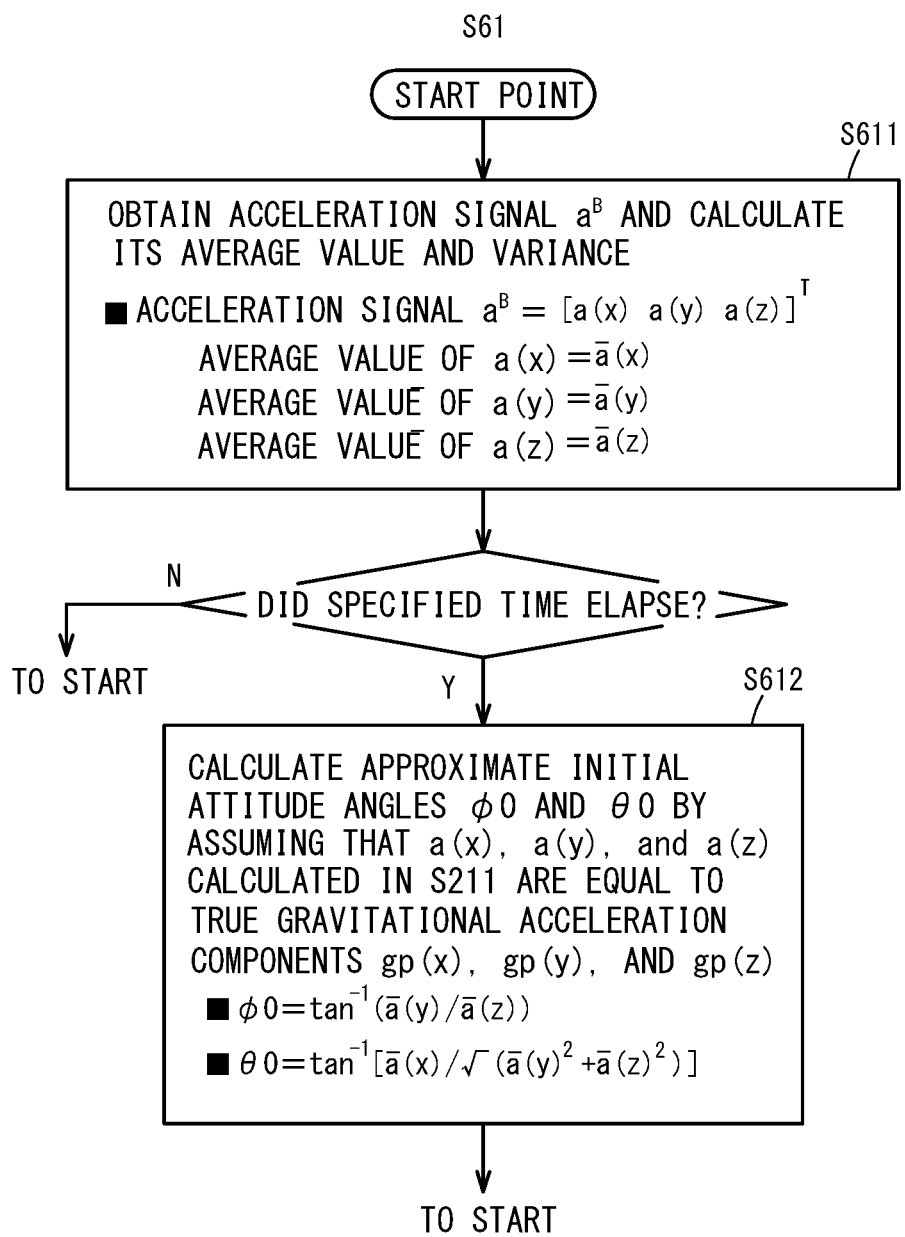
FIG. 20 is a flowchart illustrating details of an initial attitude angle calculation step of FIG. 19.

In the alignment process S2 performed by the inertial measurement apparatus 30, the processing for the initial attitude angles φ0 and θ0 out of the three initial attitude angles φ0, θ0, and ψ0 is similar to that of the inertial measurement apparatus 10 as illustrated in FIG. 19. However, the initial attitude angle ψ0 is calculated on the basis of the azimuth signal H of the electronic compass 32 as described in step S62, and the adjustment is not performed. Therefore, in the initial attitude angle calculation step S61, as illustrated in FIG. 20, only the initial attitude angles φ0 and θ0 are calculated (step S611), and are adjusted (step S612). Although it is difficult to detect the minute Earth's angular velocity with high accuracy using an inexpensive angular velocity sensor, it is possible to calculate the initial attitude angle ψ0 and perform the alignment process by using the azimuth signal H of the electronic compass 32. Detection of the angular velocity faster than the Earth's angular velocity can also be performed using the inexpensive angular velocity sensor. Therefore, it is possible to lower the cost of the angular velocity sensor 14.

Figure 21:
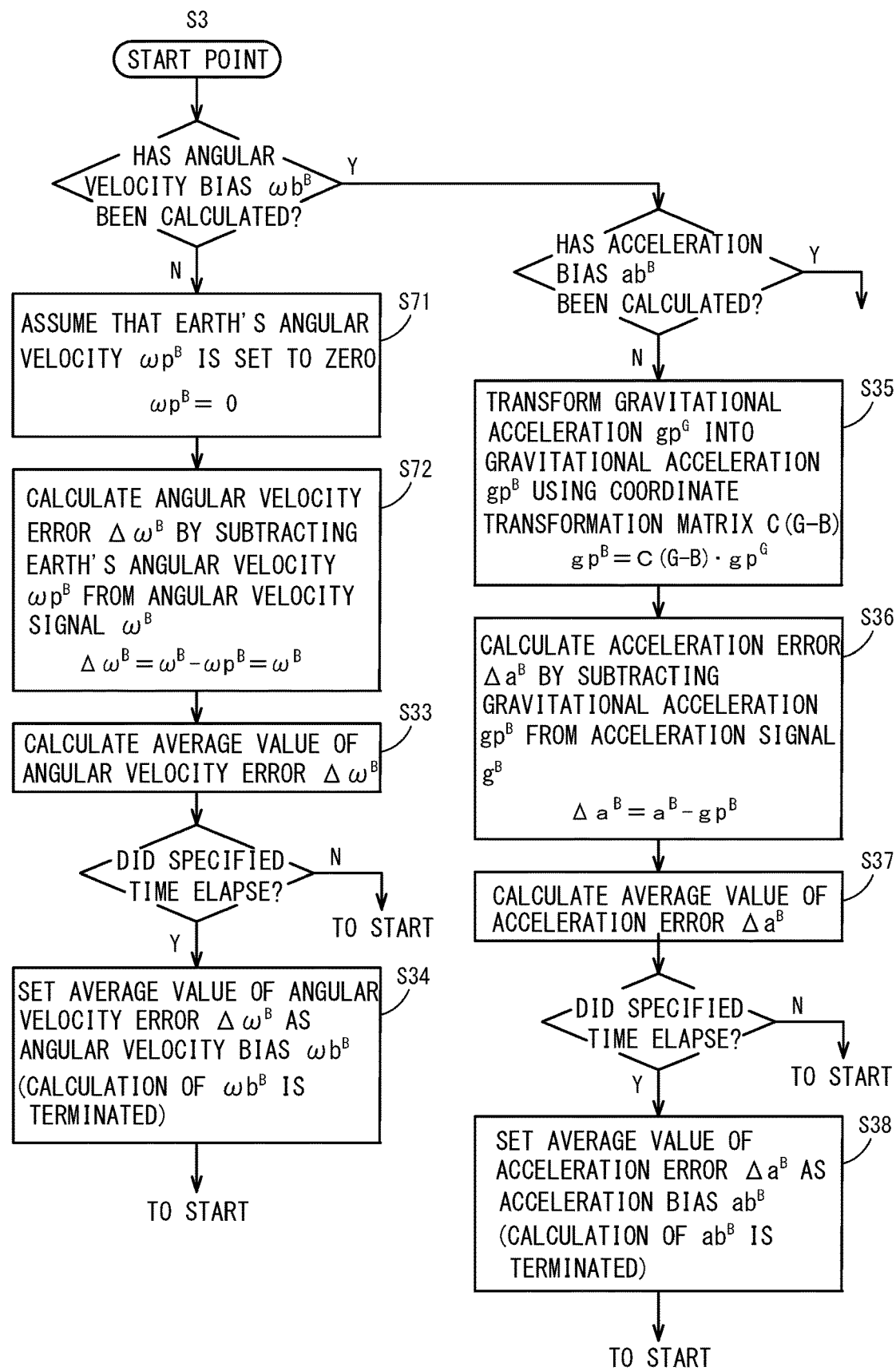
FIG. 21 is a flowchart illustrating details of the angular velocity/acceleration bias calculation process performed by the inertial measurement apparatus according to the second embodiment.
Figure 22:
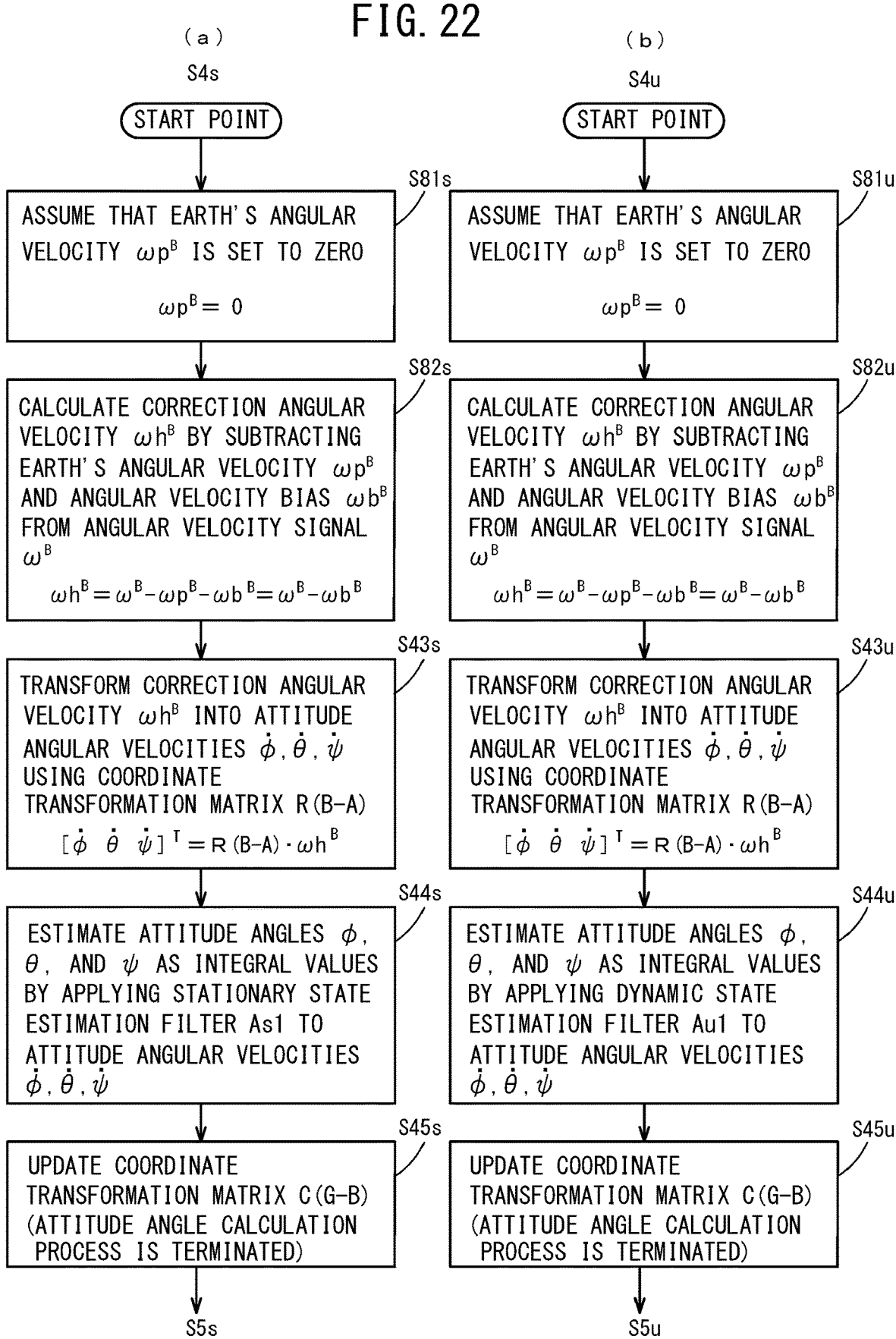
FIG. 22 is a flowchart illustrating details of the attitude angle calculation process performed by the inertial measurement apparatus according to the second embodiment, in which (a) illustrates a process performed in a stationary state, and (b) illustrates a process performed in a dynamic state.
Figure 23:
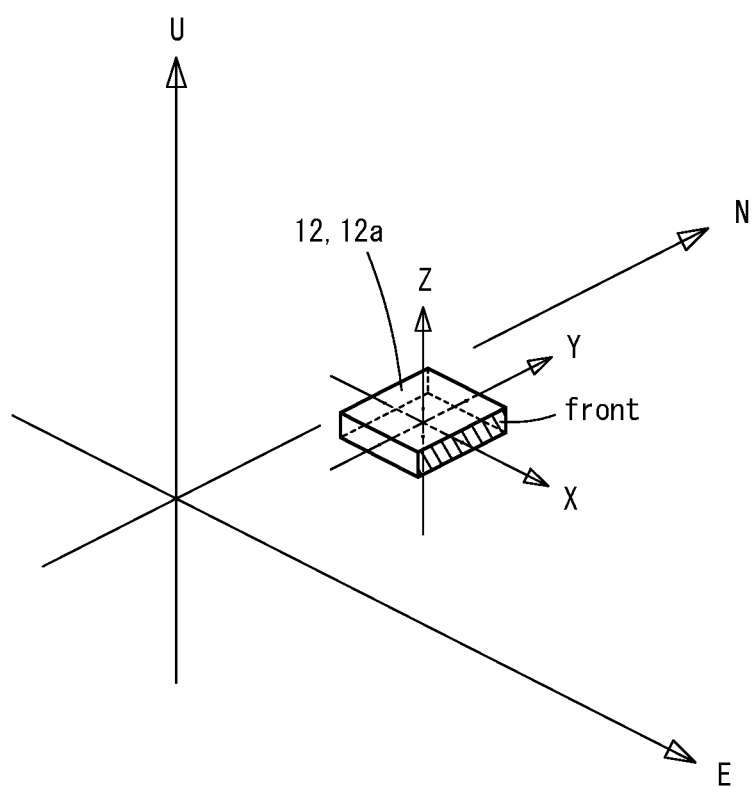
FIG. 23 is a diagram illustrating a geographic coordinate system and a body coordinate system.

In addition, in the angular velocity/acceleration bias calculation process S3, the angular velocity error $\Delta\omega^B$ is calculated by assuming that the Earth's angular velocity $\omega p^B$ is set to zero as illustrated in steps S71 and S72 of FIG. 21. Similarly, in the attitude angle calculation process S4s or S4u, the angular velocity error $\Delta\omega^B$ is calculated by assuming that the Earth's angular velocity $\omega p^B$ is set to zero as illustrated in steps S81s, S82s, S81u, and S82u of FIG. 22.

Using the inertial measurement apparatus 30 and the inertial measurement method using the same, it is possible to obtain the effects similar to those of the inertial measurement apparatus 10. Although the number of necessary sensor types increases, it is possible to lower the cost of the entire apparatus.

Note that the inertial measurement method, the inertial measurement apparatus, and the inertial measurement program according to the invention are not limited to the aforementioned embodiments. For example, the setting of the stationary state estimation filter is not limited to those of the stationary state estimation filter As1 (Formulas (3) and (4)) or the stationary state estimation filter As2 (Formulas (6) and (7)), and the contents of the formulas may be changed as long as the aforementioned effects can be achieved. In addition, although the stationary state estimation filter As1 is shared by a plurality of processes in the aforementioned embodiments, the setting may also change depending on individual process contents.

The setting of the dynamic state estimation filter is not limited to that of the dynamic state estimation filter Au1 (Formulas (4) and (5)) or the dynamic state estimation filter Au2 (Formulas (7) and (8)), and the contents of the formulas may change as long as the aforementioned effects can be achieved. In addition, although the dynamic state estimation filter Au1 is shared by a plurality of processes in the aforementioned embodiments, the setting may change depending on individual process contents.

The inertial measurement method and the inertial measurement apparatus according to the invention are suitable for inertial measurement of a multicopter or the like that makes a flight in the air. However, the inertial measurement method and the inertial measurement apparatus according to the invention may also be applied to any mobile entity other than the multicopter. In this case, it is also possible to achieve the advantageous effects described above.

REFERENCE SIGNS LIST 10, 30 Inertial measurement apparatus
12 Mobile entity
12a Body
14 Angular velocity sensor
16 Acceleration sensor
18 Filtering unit
20 Alignment unit
22 Angular velocity/acceleration bias calculation unit
24 Attitude angle calculation unit
26 Location movement amount calculation unit
28 Integrator
As1, As2 Stationary state estimation filter
Au1, Au2 Dynamic state estimation filter
S1s, S1u Filtering process
S2 Alignment process
S3 Angular velocity/acceleration bias calculation process
S4s, S4u Attitude angle calculation process
S5s, S5u Location movement amount calculation process

The invention claimed is:

1. An inertial measurement method for obtaining an attitude angle and a location movement amount of a mobile entity on the basis of an angular velocity signal output from an angular velocity sensor installed in a body of the mobile entity and an acceleration signal output from an acceleration sensor, the method comprising:

a filtering process for reducing a noise component superimposed on the angular velocity signal;

an alignment process for calculating an approximate initial attitude angle from the acceleration signal and the angular velocity signal and then precisely adjusting the initial attitude angle such that an absolute value of a velocity obtained by integrating an acceleration obtained by subtracting a gravitational acceleration from the acceleration signal becomes equal to or smaller than a predetermined value, and an absolute value of an angle obtained by integrating an angular velocity obtained by subtracting an Earth's angular velocity from the angular velocity signal becomes equal to or smaller than a predetermined value;

an angular velocity/acceleration bias calculation process for calculating an angular velocity bias by subtracting the Earth's angular velocity from the angular velocity signal and calculating an acceleration bias by subtracting the gravitational acceleration from the acceleration signal;

an attitude angle calculation process for calculating an angular velocity by subtracting the Earth's angular velocity and the angular velocity bias from the angular velocity signal and calculating the attitude angle by integrating the calculated angular velocity; and a location movement amount calculation process for calculating an acceleration by subtracting the gravitational acceleration and the acceleration bias from the acceleration signal and calculating the location movement amount by performing second-order integration for the calculated acceleration, wherein:

the filtering process, the alignment process, and the angular velocity/acceleration bias calculation process are sequentially executed in a stationary state of the mobile entity, the filtering process, the attitude angle calculation process, and the location movement amount calculation process are then executed sequentially and repeatedly, the filtering process and the alignment process in a stationary state of the mobile entity, the attitude angle calculation process in a stationary state of the mobile entity, and the location movement amount calculation process in a stationary state of the mobile entity are performed through estimation using a stationary state estimation filter capable of reducing noise superimposed on a signal, suppressing a random walk of an integral value caused by noise, and suppressing an increase of an error of an integral value caused by a bias, and the filtering process in a dynamic state of the mobile entity, the attitude angle calculation process in a dynamic state of the mobile entity, and the location movement amount calculation process in a dynamic state of the mobile entity are performed through estimation using a dynamic state estimation filter capable of reducing noise superimposed on a signal and suppressing an error of an integral value caused by noise.

2. The inertial measurement method according to claim 1, wherein:

an azimuth signal output from an electronic compass installed in a body of the mobile entity is obtained, the approximate initial attitude angle is calculated from the acceleration signal, the angular velocity signal, and the azimuth signal in the alignment process, the angular velocity bias is calculated by assuming that the Earth's angular velocity is set to zero in the angular velocity/acceleration bias calculation process, and the angular velocity is calculated by assuming that the Earth's angular velocity is set to zero and the attitude angle is calculated by integrating the angular velocity in the attitude angle calculation process.

3. An inertial measurement apparatus for obtaining an attitude angle and a location movement amount of a mobile entity on the basis of an angular velocity signal output from an angular velocity sensor installed in a body of the mobile entity and an acceleration signal output from an acceleration sensor, the apparatus comprising:

a filtering unit configured to perform a process for reducing a noise component superimposed on the angular velocity signal;

an alignment unit configured to perform a process for calculating an approximate initial attitude angle from the acceleration signal and the angular velocity signal and then precisely adjusting the initial attitude angle such that an absolute value of a velocity obtained by integrating an acceleration obtained by subtracting a gravitational acceleration from the acceleration signal becomes equal to or smaller than a predetermined value, and an absolute value of an angle obtained by integrating an angular velocity obtained by subtracting an Earth's angular velocity from the angular velocity signal becomes equal to or smaller than a predetermined value;

an angular velocity/acceleration bias calculation unit configured to perform a process for calculating an angular velocity bias by subtracting the Earth's angular velocity from the angular velocity signal and calculating an acceleration bias by subtracting the gravitational acceleration from the acceleration signal;

an attitude angle calculation unit configured to perform a process for calculating an angular velocity by subtracting the Earth's angular velocity and the angular velocity bias from the angular velocity signal and calculating the attitude angle by integrating the calculated angular velocity; and a location movement amount calculation unit configured to perform a process for calculating an acceleration by subtracting the gravitational acceleration and the acceleration bias from the acceleration signal and calculating the location movement amount by performing second-order integration for the calculated acceleration, wherein:

the filtering unit, the alignment unit, and the angular velocity/acceleration bias calculation unit sequentially execute each of the processes in a stationary state of the mobile entity, the filtering unit, the attitude angle calculation unit, and the location movement amount calculation unit then execute each of the processes sequentially and repeatedly, the process of the filtering unit and the process of the alignment unit in a stationary state of the mobile entity, the process of the attitude angle calculation unit in a stationary state of the mobile entity, and the process of the location movement amount calculation unit in a stationary state of the mobile entity are performed through estimation using a stationary state estimation filter capable of reducing noise superimposed on a signal, suppressing a random walk of an integral value caused by noise, and suppressing an increase of an error of an integral value caused by a bias, and the process of the filtering unit in a dynamic state of the mobile entity, the process of the attitude angle calculation unit in a dynamic state of the mobile entity, and the process of the location movement amount calculation unit in a dynamic state of the mobile entity are performed through estimation using a dynamic state estimation filter capable of reducing noise superimposed on a signal and suppressing an error of an integral value caused by noise.

4. The inertial measurement apparatus according to claim 3, wherein:

the alignment unit obtains an azimuth signal output from an electronic compass installed in a body of the mobile entity, and performs a process of calculating the approximate initial attitude angle from the acceleration signal, the angular velocity signal, and the azimuth signal in the alignment process, the angular velocity/acceleration bias calculation unit performs a process of calculating the angular velocity bias by assuming that the Earth's angular velocity is set to zero, and the attitude angle calculation unit performs a process of calculating the angular velocity by assuming that the Earth's angular velocity is set to zero, and calculating the attitude angle by integrating the angular velocity.

5. A non-transitory, computer-readable medium having stored thereon an inertial measurement program for obtaining an attitude angle and a location movement amount of a mobile entity on the basis of an angular velocity signal output from an angular velocity sensor installed in a body of the mobile entity and an acceleration signal output from an acceleration sensor, the program being executable by a computer to perform processes comprising:

a filtering process for reducing a noise component superimposed on the angular velocity signal;

an alignment process for calculating an approximate initial attitude angle from the acceleration signal and the angular velocity signal and then precisely adjusting the initial attitude angle such that an absolute value of a velocity obtained by integrating an acceleration obtained by subtracting a gravitational acceleration from the acceleration signal becomes equal to or smaller than a predetermined value, and an absolute value of an angle obtained by integrating an angular velocity obtained by subtracting an Earth's angular velocity from the angular velocity signal becomes equal to or smaller than a predetermined value;

an angular velocity/acceleration bias calculation process for calculating an angular velocity bias by subtracting the Earth's angular velocity from the angular velocity signal and calculating an acceleration bias by subtracting the gravitational acceleration from the acceleration signal;

an attitude angle calculation process for calculating an angular velocity by subtracting the Earth's angular velocity and the angular velocity bias from the angular velocity signal and calculating the attitude angle by integrating the calculated angular velocity; and a location movement amount calculation process for calculating an acceleration by subtracting the gravitational acceleration and the acceleration bias from the acceleration signal and calculating the location movement amount by performing second-order integration for the calculated acceleration, wherein:

the filtering process, the alignment process, and the angular velocity/acceleration bias calculation process are sequentially executed in a stationary state of the mobile entity, the filtering process, the attitude angle calculation process, and the location movement amount calculation process are then executed sequentially and repeatedly, the filtering process and the alignment process in a stationary state of the mobile entity, the attitude angle calculation process in a stationary state of the mobile entity, and the location movement amount calculation process in a stationary state of the mobile entity are performed through estimation using a stationary state estimation filter capable of reducing noise superimposed on a signal, suppressing a random walk of an integral value caused by noise, and suppressing an increase of an error of an integral value caused by a bias, and the filtering process in a dynamic state of the mobile entity, the attitude angle calculation process in a dynamic state of the mobile entity, and the location movement amount calculation process in a dynamic state of the mobile entity are performed through estimation using a dynamic state estimation filter capable of reducing noise superimposed on a signal and suppressing an error of an integral value caused by noise.

6. The non-transitory, computer-readable medium having stored thereon the inertial measurement program, according to claim 5, wherein:

an azimuth signal output from an electronic compass installed in a body of the mobile entity is obtained, the approximate initial attitude angle is calculated from the acceleration signal, the angular velocity signal, and the azimuth signal in the alignment process, the angular velocity bias is calculated by assuming that the Earth's angular velocity is set to zero in the angular velocity/acceleration bias calculation process, and the angular velocity is calculated by assuming that the Earth's angular velocity is set to zero and the attitude angle is calculated by integrating the angular velocity in the attitude angle calculation process.

* * * * *